US011122337B2

(12) United States Patent
Gupta et al.

(10) Patent No.: US 11,122,337 B2
(45) Date of Patent: Sep. 14, 2021

(54) METHODS AND SYSTEMS FOR ELECTRONIC SHOPPING THROUGH DISPLAYED MULTIMEDIA CONTENT WHILE VIEWING THEREOF

(71) Applicant: MASTERCARD INTERNATIONAL INCORPORATED, Purchase, NY (US)

(72) Inventors: Naveen Kumar Gupta, Maharashtra (IN); Dipali Pathrabe, Maharashtra (IN); Namod Chandrashekar Kunder, Maharashtra (IN); Ajit Karnik, Maharashtra (IN); Ajay Sinha, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/884,655

(22) Filed: May 27, 2020

(65) Prior Publication Data

US 2021/0021901 A1 Jan. 21, 2021

(30) Foreign Application Priority Data

Jul. 16, 2019 (SG) .......................... 10201906586P

(51) Int. Cl.
*H04N 21/478* (2011.01)
*G06K 19/06* (2006.01)
(Continued)

(52) U.S. Cl.
CPC . *H04N 21/47815* (2013.01); *G06K 19/06037* (2013.01); *G06Q 20/12* (2013.01);
(Continued)

(58) Field of Classification Search
None
See application file for complete search history.

(56) References Cited

U.S. PATENT DOCUMENTS 8,610,730 B1 * 12/2013 Li ........................ G06F 3/0481
345/520
2002/0120927 A1 * 8/2002 Harada .............. H04N 21/4331
725/23
(Continued)

*Primary Examiner* — Ricky Chin

(57) ABSTRACT

Embodiments provide methods and systems for facilitating online shopping while watching multimedia content on an electronic device. The method includes receiving an input, from a controller, from a user interested in purchasing at least one item using a machine-readable code displayed in a scene of the multimedia content. The scene comprising the machine-readable code. The machine-readable code comprising payment information for purchasing the item. The method further includes capturing at least one screenshot of the scene comprising the machine-readable code without interrupting display of the multimedia content. The method also includes identifying the at least one machine-readable code in the at least one screenshot of the scene. Upon identifying the at least one machine-readable code the method includes extracting the at least one machine-readable code from the at least screenshot of the scene for processing a payment based on payment information present in the machine-readable code.

20 Claims, 16 Drawing Sheets

(51) Int. Cl.
*G06Q 20/12* (2012.01)
*H04N 21/422* (2011.01)
*H04N 21/2543* (2011.01)
*H04N 21/81* (2011.01)

(52) U.S. Cl.
CPC ....... *H04N 21/2543* (2013.01); *H04N 21/422* (2013.01); *H04N 21/812* (2013.01)

(56) References Cited

U.S. PATENT DOCUMENTS

| | | | | |
|---|---|---|---|---|
| 2011/0114716 A1* | 5/2011 | Pratt | ................ | H04N 21/42204 235/375 |
| 2012/0085819 A1* | 4/2012 | Choi | ................ | H04N 21/44008 235/375 |
| 2012/0139826 A1* | 6/2012 | Beals | ................ | H04N 21/4312 345/156 |
| 2012/0155838 A1* | 6/2012 | Gerhards | ........... | H04N 21/6181 386/291 |
| 2012/0188112 A1* | 7/2012 | Beals | ............... | H04N 21/42204 341/176 |
| 2012/0215830 A1* | 8/2012 | Anguiano | ............ | H04N 21/418 709/203 |
| 2012/0218470 A1* | 8/2012 | Schaefer | ............ | H04N 21/8133 348/461 |
| 2012/0246667 A1* | 9/2012 | Rothschild | ....... | H04N 21/47815 725/1 |
| 2013/0332963 A1* | 12/2013 | Cheung | .................. | H04H 20/93 725/51 |
| 2015/0058870 A1* | 2/2015 | Khanna | ............ | H04N 21/47815 725/5 |
| 2015/0067748 A1* | 3/2015 | Kang | ................. | H04N 21/4108 725/110 |
| 2015/0095933 A1* | 4/2015 | Blackburn | ............. | H04N 7/141 725/25 |
| 2015/0199084 A1* | 7/2015 | Velusamy | .......... | G06Q 30/0241 715/716 |
| 2016/0066064 A1* | 3/2016 | Chesluk | ........... | H04N 21/25891 725/93 |
| 2017/0131851 A1* | 5/2017 | Thompson | ......... | H04N 21/2665 |
| 2017/0142460 A1* | 5/2017 | Yang | ................... | H04N 21/2396 |
| 2017/0178097 A1* | 6/2017 | Karnik | ............... | G06Q 20/3276 |
| 2017/0318329 A1* | 11/2017 | E | ........................ | H04N 21/6587 |
| 2018/0247657 A1* | 8/2018 | Marathe | ............ | H04L 65/1059 |
| 2018/0330362 A1* | 11/2018 | Wu | ...................... | G06Q 20/3274 |
| 2019/0087847 A1* | 3/2019 | Peasley | ............. | G06Q 50/01 |
| 2019/0141136 A1* | 5/2019 | Karnik | .................. | H04W 12/08 |
| 2019/0251144 A1* | 8/2019 | Duan | .................... | G06F 40/134 |
| 2019/0281124 A1* | 9/2019 | Lim | ..................... | G06F 16/9554 |
| 2020/0097972 A1* | 3/2020 | Karnik | .................. | G06Q 20/227 |
| 2020/0151702 A1* | 5/2020 | Sinha | .................... | G06K 7/1443 |
| 2020/0167622 A1* | 5/2020 | Sinha | .................... | G06Q 20/401 |
| 2020/0285854 A1* | 9/2020 | Merchant | ........... | H04N 21/4781 |
| 2020/0404503 A1* | 12/2020 | Kamimura | .......... | H04L 63/0876 |

* cited by examiner

METHODS AND SYSTEMS FOR ELECTRONIC SHOPPING THROUGH DISPLAYED MULTIMEDIA CONTENT WHILE VIEWING THEREOF

CROSS REFERENCE TO RELATED APPLICATION

This application claims the benefit of priority of Singapore Patent Application No. 10201906586P, filed Jul. 16, 2019, entitled "Methods and Systems for Electronic Shopping Through Displayed Multimedia Content While Viewing Thereof", the entirety of which is incorporated herein by reference.

TECHNICAL FIELD

The present disclosure relates to payment technology and, more particularly to, methods and systems for online shopping through an electronic device while viewing multimedia content on an electronic device.

BACKGROUND

Advertisements of items are part of efforts taken for increasing sales of items for decades. Various modes for advertisements include television (TV), newspapers, hoardings, digital media content players and the like. With the onset of digital era with the development of science and technology, platforms for performing e-commerce transactions have evolved at a much faster pace to attract many users through convenient and user-friendly techniques. One area for e-commerce is shopping via advertisements rendered during the view of any multimedia content on electronic devices such as television (TV), personal computers, smartphones or laptops. Amongst these, television advertisements have been able to capture a wide range of consumers belonging to different age groups, geographical locations and interests.

Currently buying goods via TV shopping has become a popular way, because the items can be ordered from the TV while enjoying watching any program with having no need to visit the physical shops to buy goods, thereby saving time and labor. Users generally watch an image or video presentation of an item through the TV screen and make a decision to purchase the item. The main issue in shopping via TV is that the time-span, for which the advertisement is typically shown on the TV screen, is generally small and especially the timeline of displaying the phone number or a purchase code for making a purchase of the item is very small. Therefore, the only choice left with the user is to quickly note down the phone number for making the purchase or to open the appropriate application in a mobile phone to access the purchase code for the payment transaction. Sometimes due to the lack of time and in absence of swift action, the user might not be able to make the purchase. Especially in live-telecast, the user does not even have the option of pausing the show to note down the contact number or scan the code via a mobile application.

In view of the above-mentioned limitations, there exists a need to devise techniques for making the online shopping and payment via the television or the electronic device with no hindrance to the user's viewing the multimedia content on the television or the electronic device.

SUMMARY

Various embodiments of the present disclosure provide online shopping and payment methods and systems by extracting details required for the payment of an item advertised in a multimedia content on the electronic device, while a user is viewing the multimedia content.

In an embodiment, a method is disclosed. The method includes receiving an input, from a controller, from a user interested in purchasing at least one item using a machine-readable code displayed in a scene of the multimedia content. The scene comprising the machine-readable code. The machine-readable code comprising payment related information for purchasing the item. The method further includes capturing at least one screenshot of the scene comprising the machine-readable code without interrupting display of the multimedia content. The method also includes identifying the at least one machine-readable code in the at least one screenshot of the scene. Upon identifying the at least one machine-readable code, the method includes extracting the at least one machine-readable code from the at least screenshot of the scene for processing a payment based on the payment related information present in the machine-readable code.

In another embodiment, a system is disclosed. The system includes a controller and an electronic device. The controller is associated with a user viewing multimedia content on the electronic device. The user sends a pre-defined input to the electronic device using the controller. The electronic device is configured to stream and display the multimedia content. The electronic device includes a memory comprising stored instructions; and at least one processor configured to execute the stored instructions to cause the system to perform the method. The method includes receiving an input, from the controller, from the user interested in purchasing at least one item using a machine-readable code displayed in a scene of the multimedia content. The scene comprising the machine-readable code. The machine-readable code including payment related information for purchasing the item. The method further includes capturing at least one screenshot of the scene comprising the machine-readable code without interrupting display of the multimedia content. The method also includes identifying the at least one machine-readable code in the at least one screenshot of the scene. Upon identifying the at least one machine-readable code the method includes extracting the at least one machine-readable code from the at least screenshot of the scene for processing a payment based on payment information present in the machine-readable code.

In yet another embodiment, another method is disclosed. The method includes receiving an input, from a controller, from a user interested in purchasing at least one item using a machine-readable code displayed in a scene of the multimedia content. The scene comprising the machine-readable code. The machine-readable code comprising payment information for purchasing the item. The method further includes capturing at least one screenshot of the scene comprising the machine-readable code. Upon capturing, the method includes identifying the at least one machine-readable code in the at least one screenshot of the scene. The method also includes storing the at least one machine-readable code in a database of the electronic device. The method further includes sending the at least one machine-readable code to the controller which is in communication with the electronic device. The method includes displaying the at least one machine-readable code on a display screen of the controller. The method further includes scanning the at least one machine-readable code, via the user device, for initiating purchase of the item and making payment transaction, via the user device, to complete the purchase of the item.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
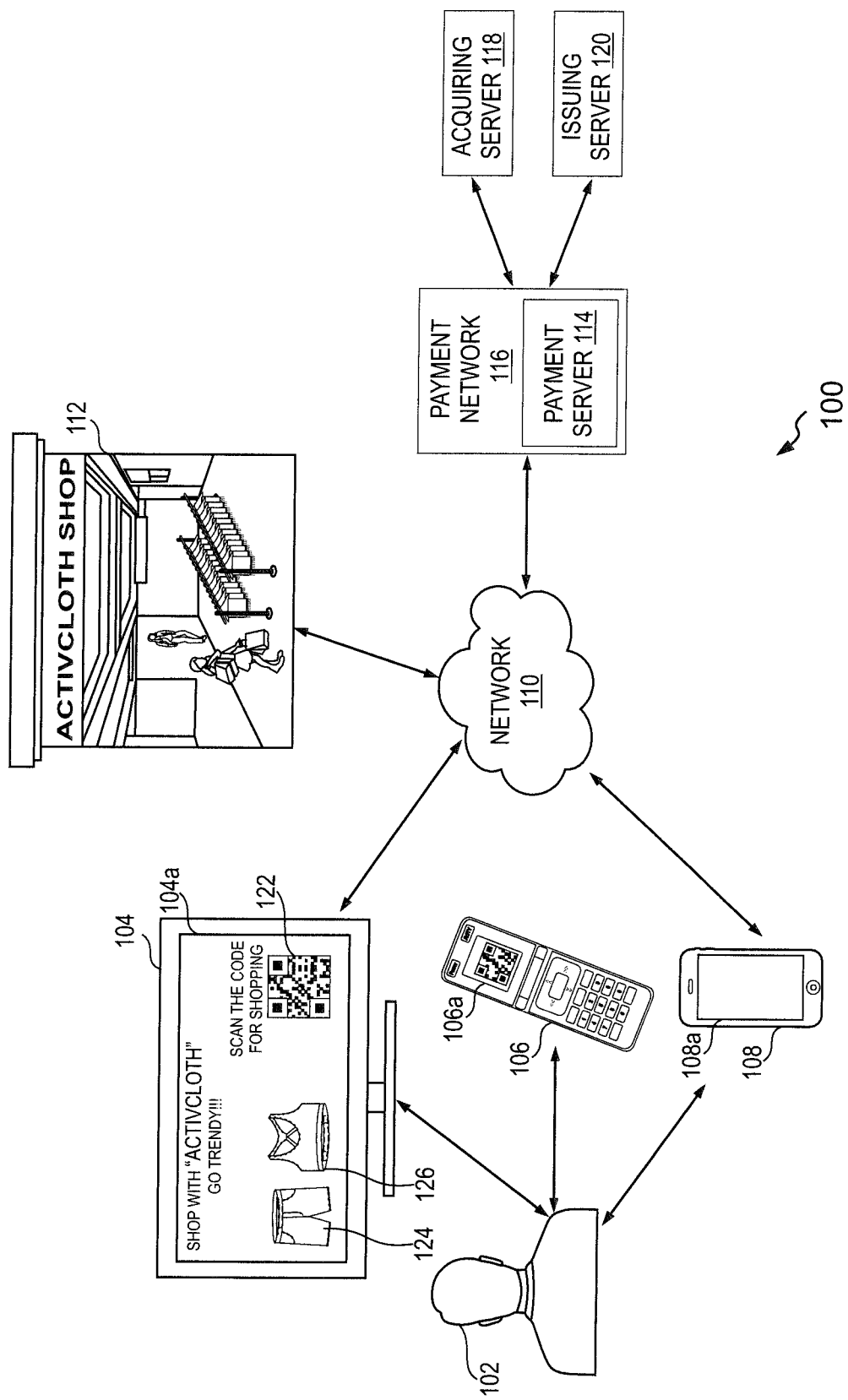
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include item or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Overview

Various example embodiments of the present disclosure provide systems and methods for facilitating online shopping and payment through an electronic device by extracting payment related details required for purchasing an item advertised on the electronic device without hindering user's view of the multimedia content on the electronic device. More specifically, techniques disclosed herein overcome the need for noting down a number for purchasing the item in a hurry or pausing the multimedia content for scanning a machine-readable code such as a Quick Response (QR) code provided for purchasing the item. Furthermore, disclosed systems and methods support an application present in the electronic device for taking screenshot of the scene which includes the machine-readable code. The application is activated based on receiving an input from the user.

The user may purchase an item through an advertisement being displayed on the electronic device while viewing multimedia content on the electronic device. The user controls the electronic device using a controller such as a remote controller. The advertisement has a scene which includes at least one QR code for purchasing the advertised item. Upon display of the scene including the at least one QR code on the electronic device, the user provides a pre-defined input to the electronic device from the controller. The input activates the application configured in the electronic device. Upon activation, the application takes at least one screenshot of the scene of the advertisement including the at least QR code. The application identifies the at least one QR code image from the screenshot and extracts the at least one QR code image from the screenshot. Upon extraction of the QR code image, the at least one QR code image maybe stored in a database of the electronic device for future access and/or the at least one QR code image may be sent to at least one of a user device or the controller. In another embodiment, QR code may not be directly visible in the scene in form of an image, but it can be accessed by the user through a link provided in the scene. For instance, the scene may include a message, a hyperlink, a symbol or an actionable button, and which upon selection, redirects the user to a QR code page, from where the application can take a screenshot of the QR code.

In at least one embodiment, the application scans a set of QR data from the at least one QR code image. The set of QR data is sent to the user device for payment processing of the item purchased by the user. In an alternate embodiment, another application, for instance a payment application, associated with a payment server, may be installed in the electronic device for enabling payments through the electronic device. The payment application is configured to scan the QR code and to read the set of QR data from the QR code. Upon reading the set of QR data from the QR code, the payment application initiates a payment process by sending the set of QR data to the payment server. The payment application is also configured to send payment credentials of at least one payment card associated with the user to the payment server. The payment application can also direct the set of QR data and payment credentials of at least one payment card associated with the user to an acquiring server and the acquiring server will then forward it to the payment server.

In at least one embodiment, the at least one QR code is sent to the user device. The QR code is displayed on a display screen of the user device. The user can select a "QR capture mode" to enable capturing of the at least one QR code in the user device. The payment application associated with a payment server is installed in the user device for enabling payments through the user device. The payment application is configured to access the at least one QR code in the user device. The QR code is read using a QR code reader and a set of QR data is extracted from the QR code. The set of QR data includes payment related information that may help in initiating the payment transaction. For example, the payment related information may include the merchant information such as, merchant identifier, merchant account details, service/item information and optionally a payment amount.

After selecting the QR capture mode, a capture overlay frame appears on a display screen of the user device. The capture overlay frame helps in capturing the QR code displayed on the display screen. In another embodiment, selecting the QR capture mode may provide a floating button that appears afloat on the display screen and can be moved anywhere on the display screen. The user may drag the floating button and position it over the QR code for capturing the QR code. However, it should be apparent to a person skilled in the art that the QR code can be read by any alternate technique including but not limited to reading coordinates of pixels, reading pixel data or the like to extract the set of QR data embedded in the QR code. Once the QR code is captured, the QR code reader extracts the set of QR data that may be used for processing the payment transaction for purchasing the advertised item.

In an additional or alternate embodiment, the controller comprises a display screen which is configured to display the multi-media content which is being displayed on the electronic device in "a content streaming mode", and is also configured to display the at least one QR code sent from the electronic device in a "QR capture mode". The user can select one of the content streaming mode or the QR capture mode. In the QR capture mode the at least one QR code is scanned by any electronic device supporting the payment application which enables scanning of the QR code and further supports reading the set of QR data from the QR code. Upon reading the set of QR data from the QR code, the payment application initiates payment process by sending the set of QR data of the at least one QR code to the payment server.

The facilitation of online shopping and payment through advertisements on the TV by extracting at least one QR code is further explained in detail with reference to FIGS. 1 to 15. It shall be noted that the description of the present disclosure is made with respect to QR codes being example of machine-readable code for exemplary purposes only, and that the present disclosure can be practiced with any other suitable forms of machine-readable code. Further, it shall be noted that the description of the present disclosure is limited to television (TV) as the electronic device for exemplary purposes only, and that the present disclosure can be practiced with any other electronic device configured to display multimedia content and supports the application for example, but not limiting to, personal computer, smart phones, laptop, video player or tablets.

FIG. 1 illustrates an example representation of an environment 100 related to at least some example embodiments of the present disclosure. The environment 100 includes a user 102 viewing multimedia content on a TV 104, a controller 106 and a user device 108, a network 110, a payment server 114, a payment network 116, an acquiring server 118 and an issuing server 120. The user is engaged with the TV 104, the controller 106 and the user device 108. An advertisement on the TV 104 is hosted by a merchant 112 for selling his items 124,126 through e-commerce. The merchant 112 may provide a machine-readable code 122 embedded in some frames of the advertisement for accepting payments from the user 102. Examples of the merchant 114 may include any retail shop, restaurant, supermarket or establishment, and/or private agencies, or any service provider that support machine-readable code based payment for performing financial transaction in exchange for any goods and/or services. In a non-limiting example, the machine readable code 122 maybe generated by the acquiring server 118 associated with the merchant 112.

The acquiring server 118 is associated with a financial institution normally called as a "merchant bank" or an "acquiring bank" or an "acquirer bank" or simply an "acquirer", in which the merchant or the service provider entities may have an account. The issuing server 120 is associated with a financial institution normally called as an "issuer bank" or "issuing bank" or simply "issuer", in which the user 102 may have an account, which issues one or more payment cards, such as a credit card or a debit card. The TV 104, the user device 108, the controller 106, and the payment server 114 are communicatively coupled via the network 110. The payment server 114 communicates with the acquiring server 118 and the issuing server 120 via the payment network 116, which is connected with the network 110. The network 110 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In one example scenario, the user 102 is viewing a video on the TV 104 when an advertisement for a set of designer women clothing 124, 126 of brand "Activcloth" starts displaying on a display screen 104a of the TV 104. In this scenario, the brand "Activcloth" maybe name of the merchant 112 and the set of designer women clothing 124 and 126 are the items for sale as per the advertisement. When the advertisement is about to end, a scene is displayed which includes at least one QR code 122 for purchasing the women clothing 124 and 126. The user 102, interested in buying the set of designer women clothing 124 and 126, provides an input to the TV 104 by performing an action on the controller 106 by which the user 102 is controlling the TV 104. The action may include a click/press/selection of a dedicated button on the controller 106, or click/press/selection of a pre-defined sequence of at least one alphabet, numeric or special characters provided in a user interface of the controller 106. The action may also be in form of performing a pre-defined gesture in proximity of the TV 104, giving a voice input to the TV 104 or performing a pre-defined movement of the controller 106 in a particular direction. It should also be noted that the functions of the controller 106 can also be provided by the user device 108. In an alternate embodiment, the scene may include a message or a link which is redirect-able to a QR code page, a merchant website, or a payment page containing QR code for facilitating purchase and payment of the set of the designer women clothing 124, 126 through the advertisement.

The pre-defined input received from the user 102 activates an application (representatively shown in FIGS. 6 and 7) installed in the TV 104. The application can be pre-installed application in the TV 104. The application can also be installed in the TV 104, from a server such as the payment server 114, communicatively coupled to or otherwise accessible to the TV 104. Upon activation, the application is configured to take a screenshot of the scene which includes the QR code 122 for purchasing the set of designer women clothing 124 and 126. The application is further configured to identify the QR code 122 in the screenshot of the scene and then extract the QR code 122 from the screenshot of the scene. The QR code 122 extracted from the screenshot of the scene may be sent to at least one of the controller 106 or the user device 108. The QR code 122 extracted from the screenshot of the scene may be stored in a database in the TV 104 for future access. Alternatively, the application installed in the TV 104 is also configured to read a set of QR data from the QR code 122 and send the extracted set of QR data of the QR code 122 to the user device 108. The set of QR data sent to the user device 108 is read by the payment application installed in the user device for enabling payments through the user device 108. The payment application may be hosted by the payment server 114.

In some example embodiments, the QR code 122 may be displayed on a display screen 108a of the user device 108. The user 102 can select a "QR capture mode" to enable capturing of the QR code in the user device 108. The payment application associated with the payment server 114 is installed in the user device for enabling payments through the user device 108. The payment application may also include or has access to a machine-readable code scanning application in the user device 108. An example of the machine-readable code scanning application is a QR code reader application which is configured to access the QR code 122 in the user device 108. The QR code 122 is read using a QR code reader application and a set of QR data is extracted from the QR code 122. The set of QR data includes payment related information that may help in initiating the payment transaction. For example, the payment related information may include the merchant information such as, merchant identifier, merchant account details, service/item information and optionally a payment amount.

After selecting the QR capture mode, the QR code reader application renders a capture overlay frame on a display screen 108a of the user device 108. The capture overlay frame helps in capturing the QR code 122 displayed on the display screen 108a. In another example embodiment, selecting the QR capture mode may provide a floating button that appears afloat on the display screen 108a of the user device 108 and can be moved anywhere on the display screen 108a of the user device 108. The user 102 may drag the floating button and position it over the QR code 122 for capturing the QR code 122. However, it should be apparent to a person skilled in the art that the QR code 122 can be read by any alternate technique including but not limited to reading coordinates of pixels, reading pixel data or the like to extract the set of QR data embedded in the QR code. Once the QR code 122 is captured, the QR code reader extracts the set of QR data that may be used for processing the payment transaction for purchasing the advertised items 124 and 126.

In an additional or alternate embodiment, the controller 106 comprises a display screen 106a which is configured to display, in a "content streaming mode", the multi-media content which is being displayed on the TV 104, and display, in a "QR capture mode", the at least one QR code 122 sent from the TV 104. The user 102 can select one of the content streaming mode or the QR capture mode. In the QR capture mode, the at least one QR code 122 is scanned by any computing device, for example in a non-limiting manner the user device 108, supporting a payment application which enables scanning of the QR code 122 and further supports reading the set of QR data from the QR code 122. Upon reading the set of QR data from the QR code 122, the payment application initiates payment process by sending the set of QR data of the QR code 122 to the payment server 114 via the network 110.

The QR code 122 may be generated by the merchant 112 for accepting payments from the user 102, and the QR code 122 is integrated in a multimedia content such as advertisement content. The merchant 112 may generate the QR code 122 with the help of a QR code generator or a third-party application for generating QR codes.

Figure 10:
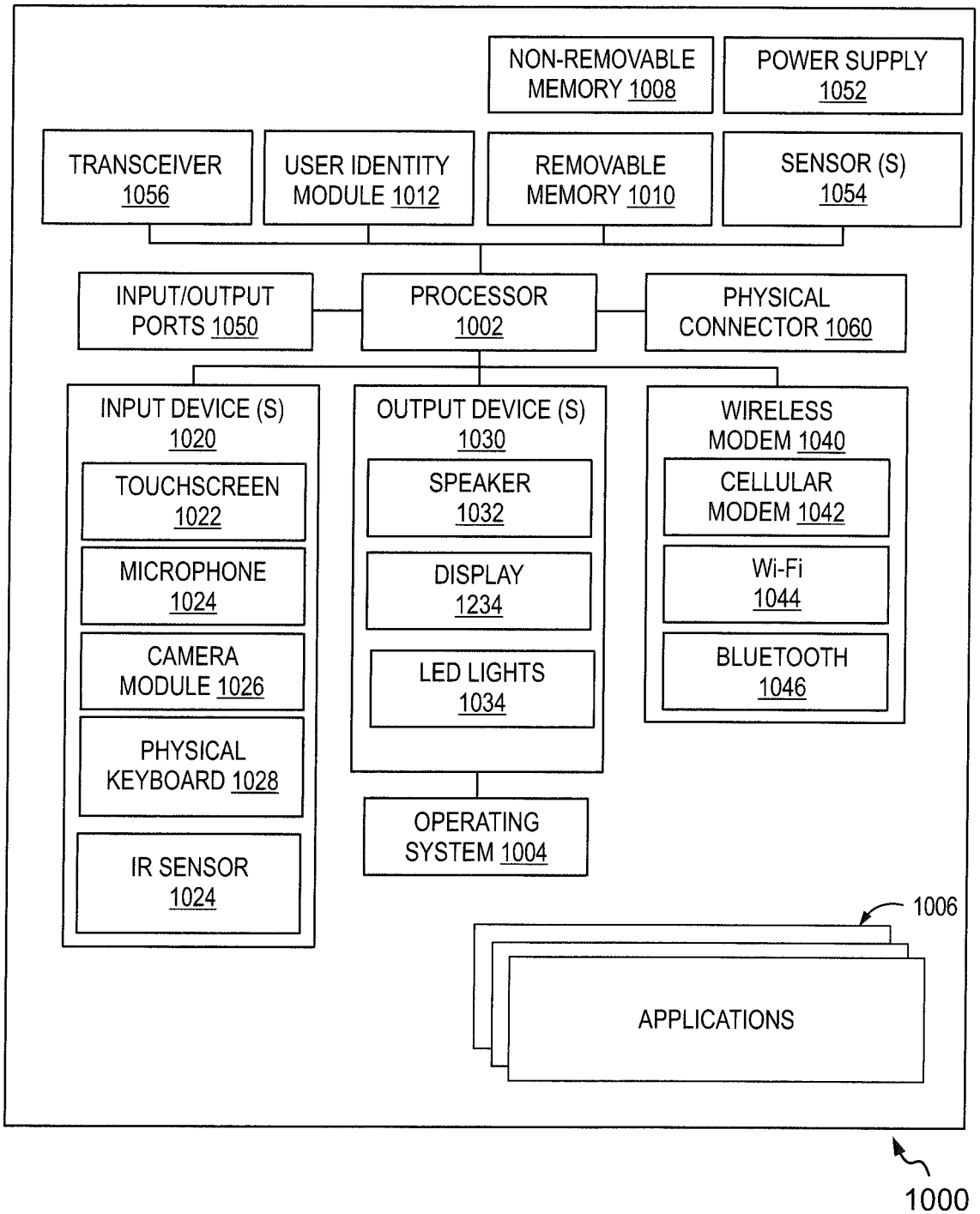
FIG. 10 represents a simplified block diagram of a user device, in accordance with an example embodiment of the present disclosure.

In an example embodiment, the user device 108 is equipped with the payment application (shown in FIG. 10). In an example, the payment application may be hosted by the payment server 114. The user device 108 can communicate with the payment server 114 through the payment application installed in the user device 108 via the network 110 and a payment network 116. The payment application is a set of computer executable codes configured to facilitate the user device 108 to access the at least one QR code 122 displayed on the display screen of the user device 108. Moreover, the payment application may enable the user device 108 to capture and read the at least one QR code 122 displayed on the display screen 108*a* in the user device 108.

The payment application sends the payment transaction request from the user device 108 to the payment server 114 via the payment network 116. The payment server 114 processes the payment transaction and settles payment transaction between the acquiring server 118 of the merchant 112 and an issuing server 120 of the user 102.

It is noted that the user 102 does not have to pause or miss the ongoing multimedia content displayed on the TV 104, and is able to make payment transaction using the QR code 122 displayed in the commercial advertisement, hence the technical effect of the present disclosure is to facilitate means for allowing the user 102 to make payment transaction without interrupting the viewing of any content on the TV 104 or similar electronic devices.

Some non-exhaustive example embodiments of facilitation of online shopping and payment through advertisements on the electronic device by extracting at least one QR code is described with reference to FIGS. 2A-2B to 15.

Figure 2A:
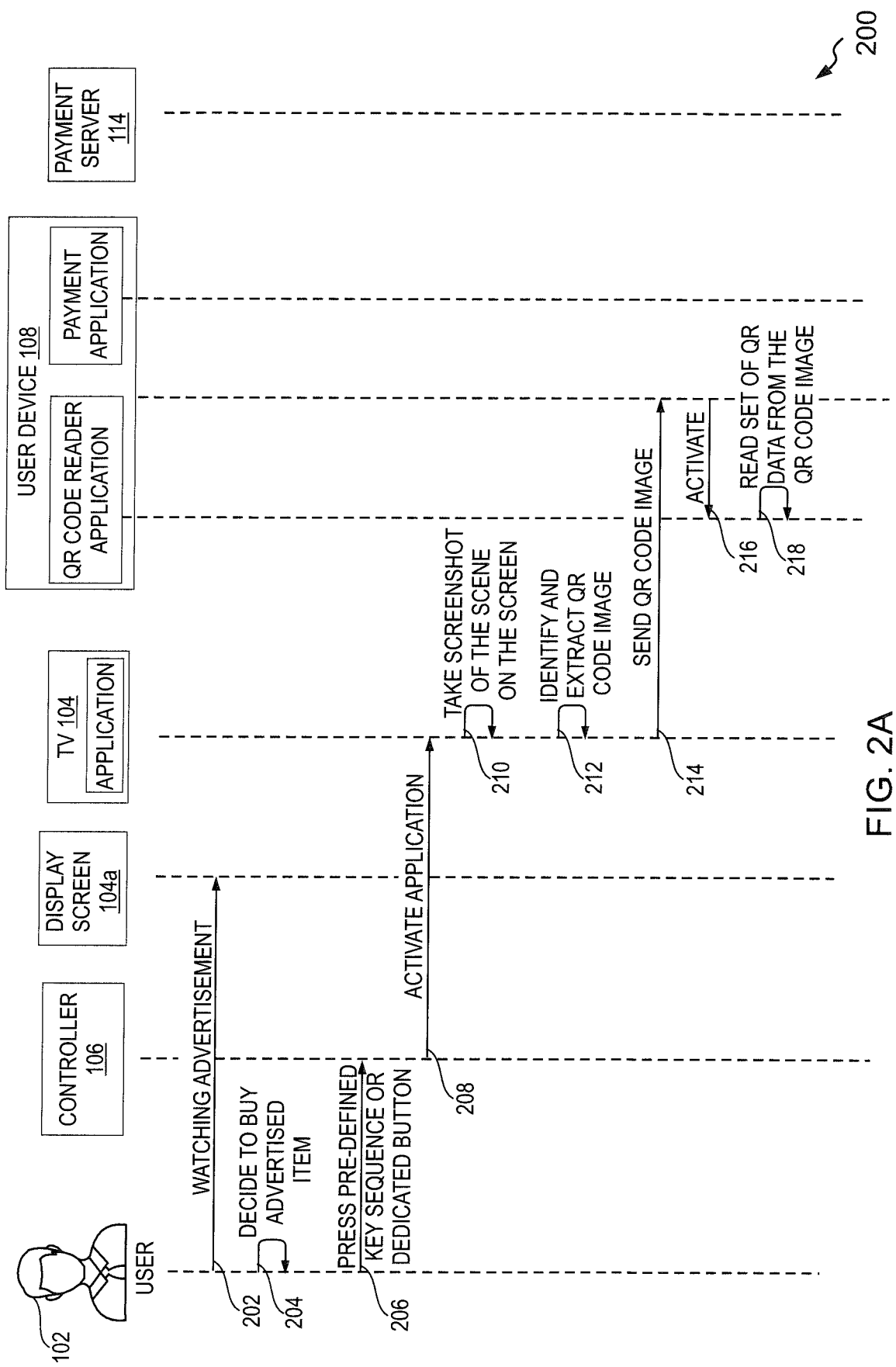
FIGS. 2A and 2B collectively represent a sequence flow diagram of a method of facilitating online shopping for the item through advertisement on TV by extracting a QR code image from the advertisement and sending the QR code image to the user device, in accordance with an example embodiment of the present disclosure.
Figure 2B:
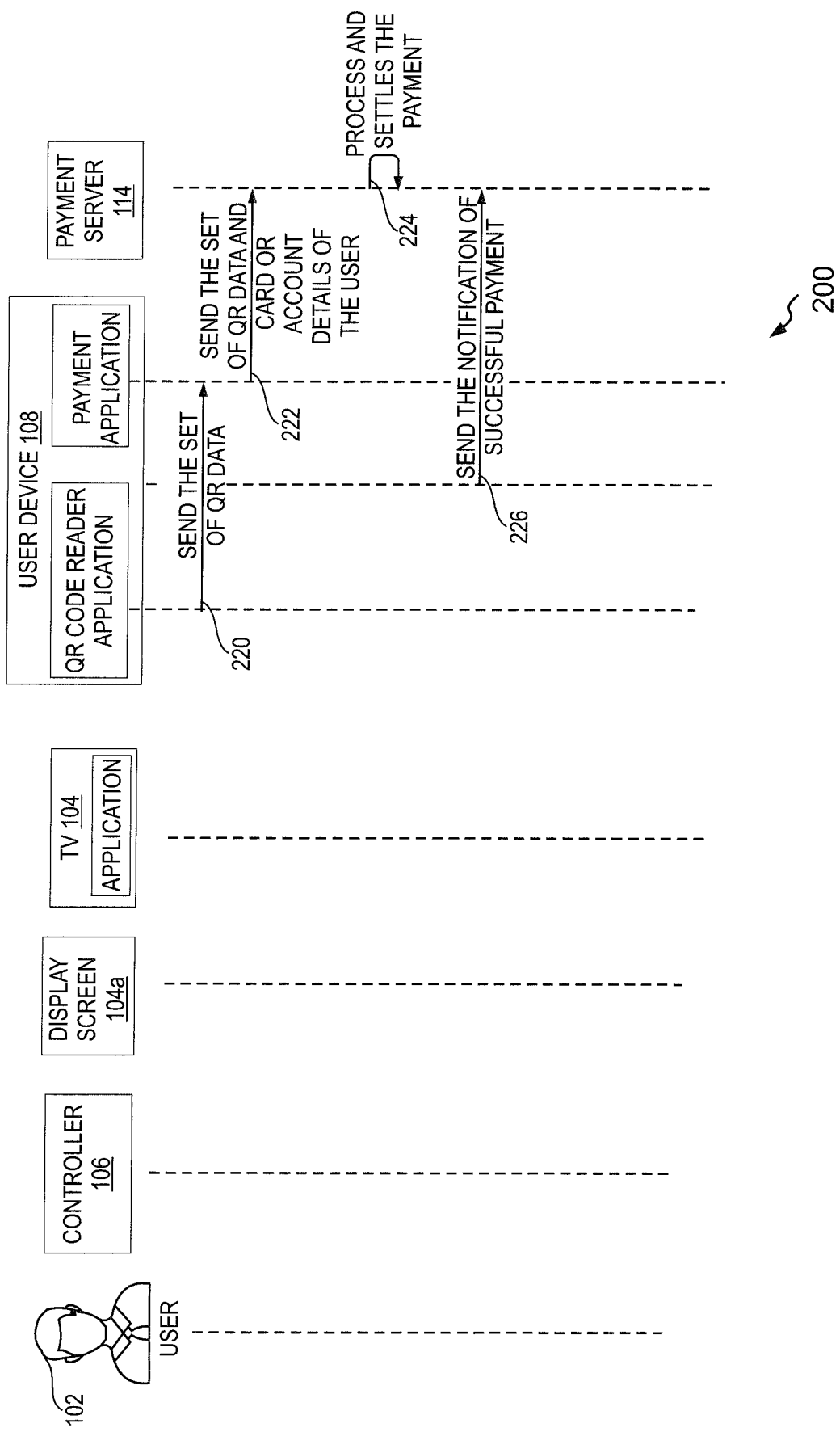

FIGS. 2A and 2B collectively represent a sequence flow diagram 200 of a method of facilitating online shopping for the item through the TV advertisement by extracting a QR code image (e.g., the QR code 122) displayed on the advertisement of the item and sending the QR code image to the user device 108, in accordance with an example embodiment of the present disclosure.

Operation 202 represents the user 102 viewing an advertisement of at least one item on the display screen 104*a* of the TV 104. The advertisement includes at least one QR code 122 for purchasing the item. Operation 204 represents an interest of the user to buy the advertised item.

At 206, the user 102 provides an input to the TV 104 for initiating buying of the item. The user 102 may provide the input in a variety of ways. For instance, the user 102 may click on a dedicated button on the controller 106 by which the user 102 is controlling the TV 104. In some cases, instead of dedicated button, the input may be provided to the TV 104 if keys of the controller 106 are pressed in a pre-defined key sequence. Without losing the generality of the present disclosure, the input can be provided in various ways such as performing a pre-defined gesture in proximity of the TV 104, giving a voice input to the TV 104 or pre-defined movement (e.g., making a structure of number '8') of the controller 106 in a particular direction.

At 208, upon receiving the input from the user 102, an application in TV 104 is activated. At 210, the application is configured to take screenshot of the scene which includes the at least one QR code 122 for purchasing the item.

At 212, the application identifies the QR code 122 in the screenshot of the scene and then extracts the QR code image from the screenshot of the scene. The image of the QR code 122 extracted from the screenshot of the scene may be stored in a database in the TV 104 for future access.

At 214, the QR code 122 image extracted from the screenshot of the scene is sent to the user device 108.

Figure 3:
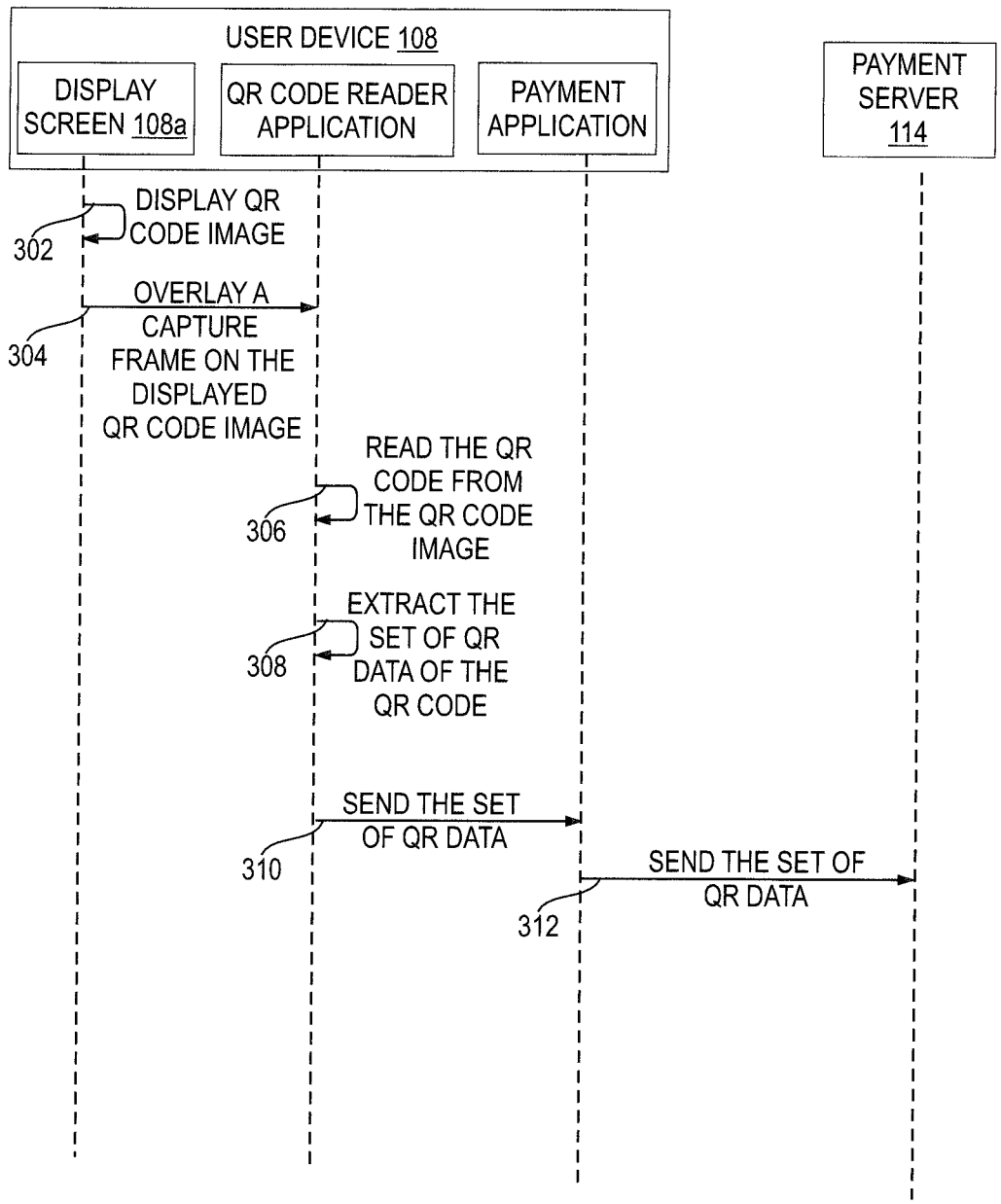
FIG. 3 represents a sequence flow diagram of facilitating reading of QR data from the QR code image displayed on a display screen of the user device for payment for the item displayed in the advertisement on the TV, in accordance with another example embodiment of the present disclosure.

At 216, a machine-readable code scanning application such as a QR code reader application in the user device 108 is activated for reading the QR code 122 being displayed on the display screen 108*a* of the user device 108. At 218, the QR code reader application in the user device 108 reads a set of QR data from the at least one QR code image being displayed on the display screen 108*a* of the user device 108. One example of sub-steps of reading the QR code 122 being displayed on the display screen 108*a* of the user device 108 is illustrated in FIG. 3. The QR code reader application can be a component in the payment application installed in the user device 108.

At 220, the QR code reader application sends the set of QR data of the QR code 112 to the payment application for initiating the payment process based on the set of QR data of the QR code.

At 222, the payment application shares the details such as the set of QR data and card or account details of the user 102 to the payment server 114. The card details or the account details may also be entered by the user 102 in the payment application at the time of making the payment transaction request or they can be pre-saved in the payment application by the user 102.

At 224, the payment server 114 processes and settles payment between the acquiring server 118 of the merchant 112 and an issuing server 120 of the user 102. At 226, the payment server 114 notifies the user by sending notification of successful payment to the user device 108.

FIG. 3 represents a sequence flow diagram 300 of facilitating reading of QR data from the QR code image displayed on a display screen 108*a* of the user device 108 for payment for the item displayed on the advertisement of the item, in accordance with an example embodiment of the present disclosure.

At 302, upon receiving the QR code image from the TV 104, the QR code image is displayed on the display screen 108*a* of the user device 108. The user 102 activates the QR code reader application in the user device 108 for reading the displayed QR code image. Alternatively, the user 102 can select "a QR capture mode" in the user device 108 to activate the QR code reader application in the user device.

At 304, the QR code reader application overlays a capture frame on the QR code image being displayed on the display screen 108*a* of the user device 108. The capture overlay frame helps in capturing the QR code 122 displayed on the display screen 108*a*. In another example embodiment, selecting the QR capture mode may provide a floating button that appears afloat on the display screen 108*a* of the user device 108 and can be moved anywhere on the display screen 108*a* of the user device 108. The user 102 may drag the floating button and position it over the QR code 122 for capturing the QR code 122.

At 306, the QR code reader application reads the QR code from the QR code image. At 308, the QR code reader application extracts a set of QR data from the QR code. At 310, the set of QR data are sent to the payment application for initiating the payment process.

At 312, the payment application sends the received set of QR data to the payment server 114. The set of QR data includes payment related information that may help in initiating the payment transaction. For example, the payment related information may include the merchant information such as, merchant identifier, merchant account details, service/item information and optionally a payment amount.

Figure 4A:
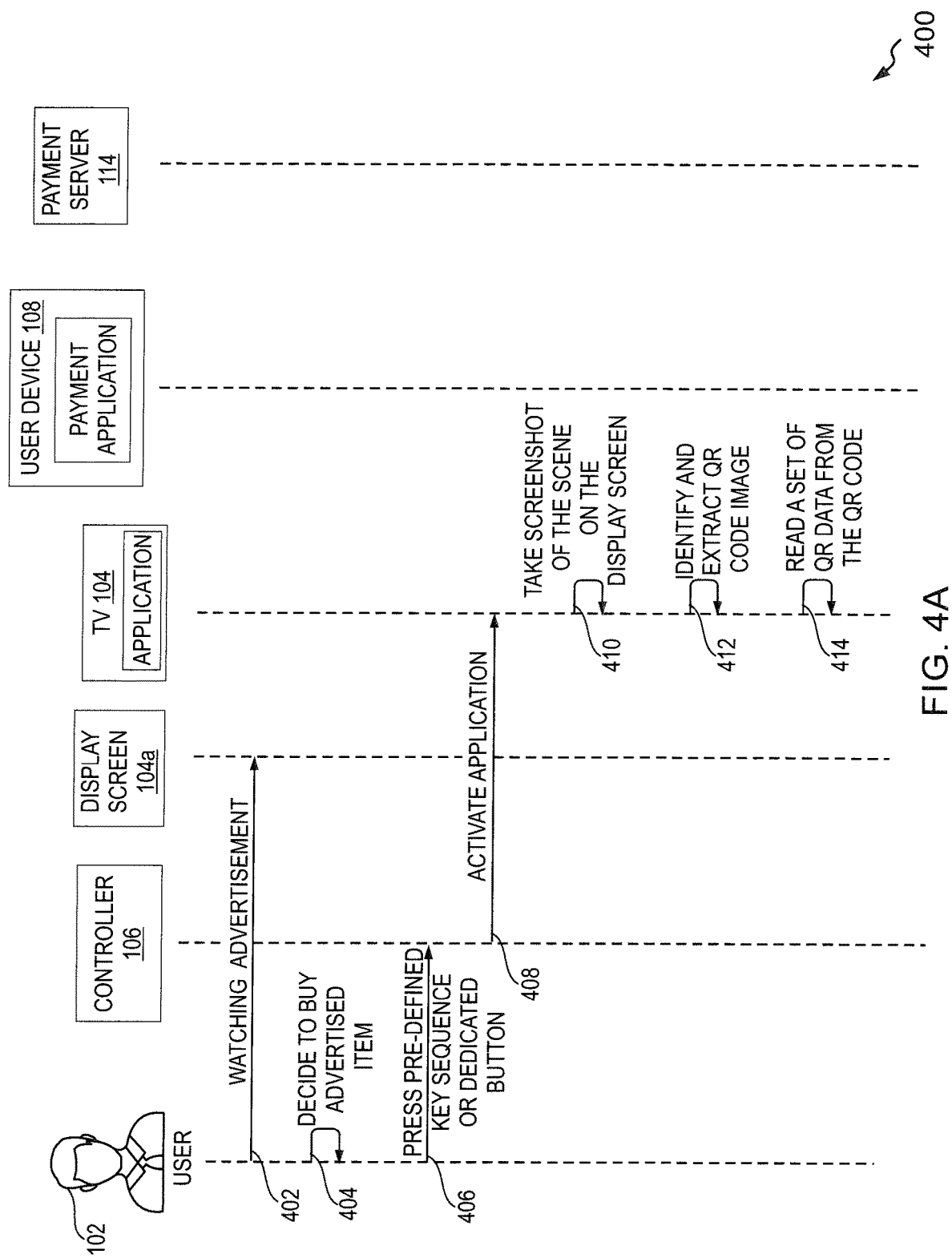
FIGS. 4A and 4B collectively represent a sequence flow diagram of a method of facilitating online shopping for the item through the advertisement by extracting a set of QR data from QR code image from the advertisement on TV and sending the set of QR data to a user device, in accordance with another example embodiment of the present disclosure.
Figure 4B:
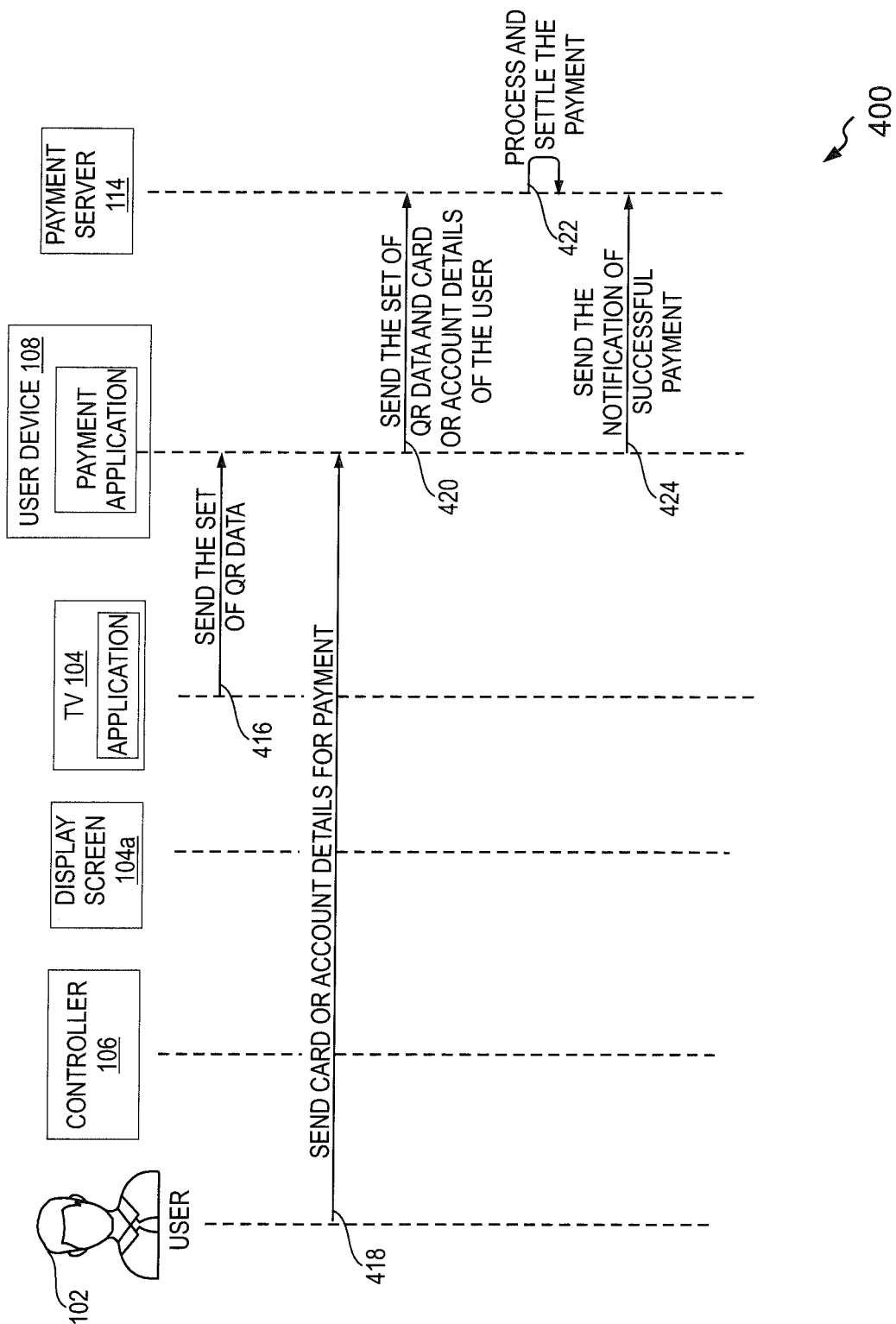

Referring now to FIGS. 4A and 4B, a sequence flow diagram 400 of another method of facilitating online shopping for the item through the TV advertisement by extracting a set of QR data from QR code image (e.g., the QR code 122) displayed on the advertisement of the item and sending the set of QR data to the user device 108, in accordance with an example embodiment of the present disclosure.

The operations 402-412 are same as operations or equivalent of operations 202-212, respectively, described with reference with FIGS. 2A-2B, so these operations are not explained again for the sake of brevity.

At operation 414, the application reads a set of QR data from the QR code 122 image extracted from the screenshot of the scene of the advertisement.

At operation 416, the set of QR data are sent from the TV 104 to the user device 108. The payment application in the user device 108 accesses the received set of QR data of the QR code 122.

The set of QR data includes payment related information that may help in initiating the payment transaction. For example, the payment related information may include the merchant information such as, merchant identifier, merchant account details, service/item information and optionally a payment amount.

At operation 418, the payment application in the user device 108 also receives card details or account details from the user 102 for the payment for the purchased item. The card details or the account details may also be pre-saved in the payment application by the user 102. At 420, the payment application sends the received set of QR data and the card details or account details from the user 102 to the payment server 114 via the payment network 116. At 422, the payment server 114 processes the payment transaction and settles payment transaction between the acquiring server 118 of the merchant 112 and the issuing server 120 associated with payment account of the user 102. Alternatively, the payment application may send the payment transactions to the acquiring server 118 for payment processing and the acquiring server 118 sends the payment transaction to the payment server 114 via the payment network 116.

At operation 424, the payment server 114 sends a notification message to the user device 108 notifying the successful payment.

Figure 5:
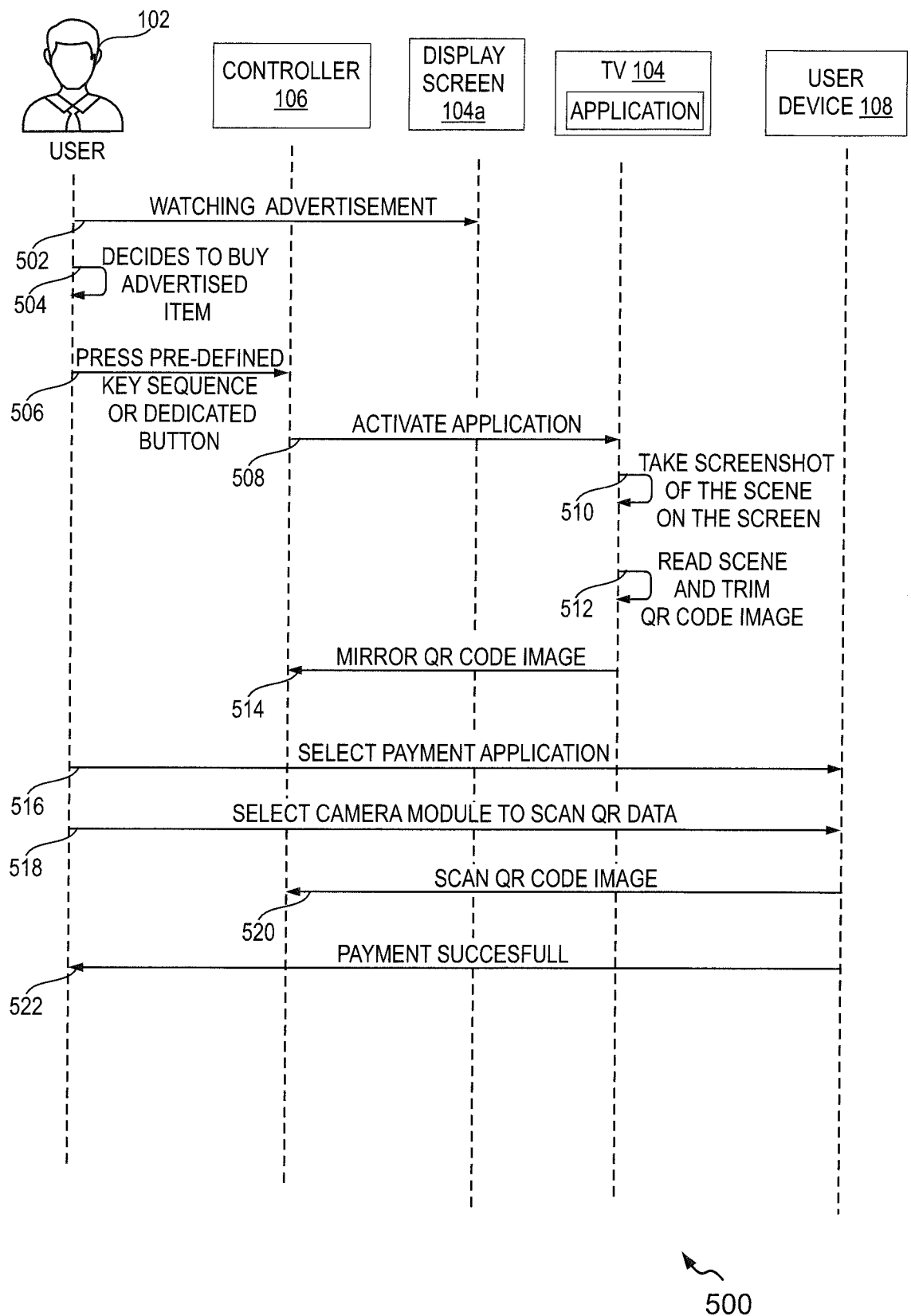
FIG. 5 represents a sequence flow diagram of a method of facilitating online shopping for the item through the advertisement by extracting QR code image from the advertisement and sending the QR code image to a controller, in accordance with another example embodiment of the present disclosure.

Referring now to FIG. 5, a sequence flow diagram 500 of another method of facilitating online shopping for the item through the TV advertisement by extracting QR code image (e.g., the QR code 122) displayed on the advertisement of the item and sending the QR code image to the controller 106, in accordance with another example embodiment of the present disclosure.

The operations 502-512 are same as operations or equivalent of operations 202-212, respectively, described with reference with FIGS. 2A-2B, so these operations are not explained again for the sake of brevity.

At 512, the application in the TV 104 extracts the QR code image from the screenshot of the scene of the advertisement by trimming the QR code image from the screenshot.

At 514, the application sends a mirrored image of the extracted QR code image to the controller 106. In one example embodiment, the controller 106 comprises a display screen 106a which is configured to display, in "a content streaming mode", the multimedia content which is being displayed on the TV 104, and display, in a "QR capture mode", the at least one QR code 122 image sent from the TV 104. The user 102 can select one of the content streaming mode or the QR capture mode in the controller 106.

At 516, the user 102 selects the payment application in the user device 108 for reading the displayed QR code 122 image on the controller 106. At 518, the user 102 selects a camera module, via the payment application, to scan the QR code 122 image being displayed on the display screen 106a of the controller 106.

At 520, the payment application scans the QR code 122 image using the camera module of the user device 108. At 522, the payment processing is completed. The payment application initiates payment process by sending the set of QR data of the QR code 122 to the payment server 114 via the payment network 114. The step 520 comprises steps 422-426 of the FIGS. 4A and 4B.

Figure 6:
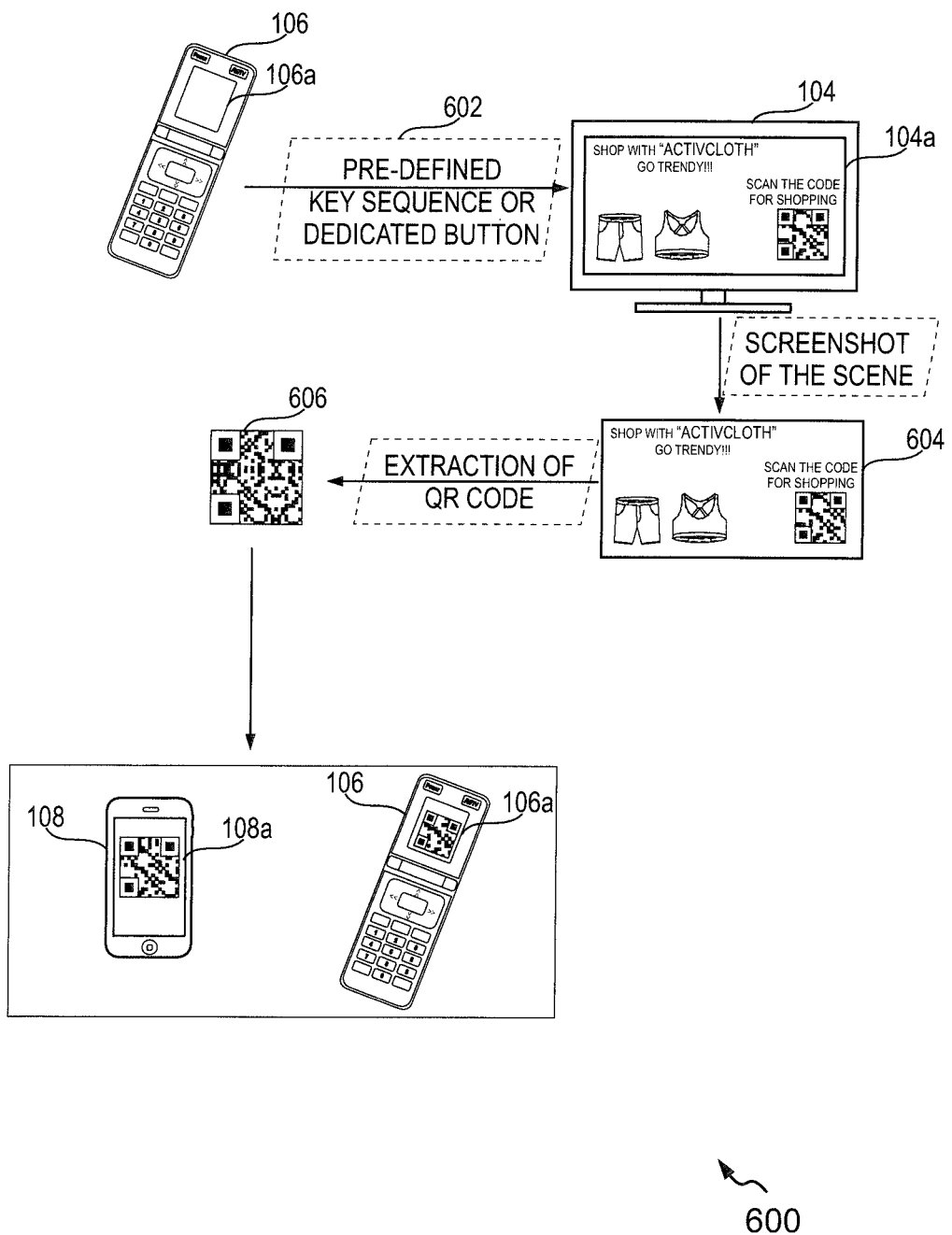
FIG. 6 is an example representation of various inputs and outputs during the process of extracting the QR code from a scene of the advertisement which comprises at least one QR code, in accordance with an example embodiment of the present disclosure.

Referring now to FIG. 6, an example representation of various inputs and outputs during the process of extracting the QR code or set of QR data from the captured screenshot of the scene of the advertisement which comprises at least one QR code, is shown in accordance with an example embodiment of the present disclosure.

The user 102 interested in buying an item displayed in the TV advertisement on the TV 104 provides an input 602 to the TV 104 by clicking on a dedicated button on the controller 106 or pressing a pre-defined key sequence on the controller 106.

The input 602 is received by the TV 104 and the application in the TV 104 is activated. The application takes a screenshot 604 of the scene of the TV advertisement being displayed on the display screen 104a of the TV 104. The application further extracts at least one QR code image 606 from the screenshot 604 of the scene of the TV advertisement. The application sends extracted at least one QR code image 606 to at least one of the user device 108 or the controller 106. The extracted QR code image 606 is displayed on at least one of the display screen 108a of the user device 108 or on the display screen 106a of the controller 106.

As the QR code image 606 is displayed on the user device 108, the user device 108 extracts the payment information from the QR code image 606 using suitable applications, and initiates the payment for purchasing the item. Alternatively, as the QR code image 606 is displayed on the controller 106, the user device 108 captures the display of the controller and extracts the payment information from the captured QR code image 606 using suitable applications, and initiates the payment.

Figure 7:
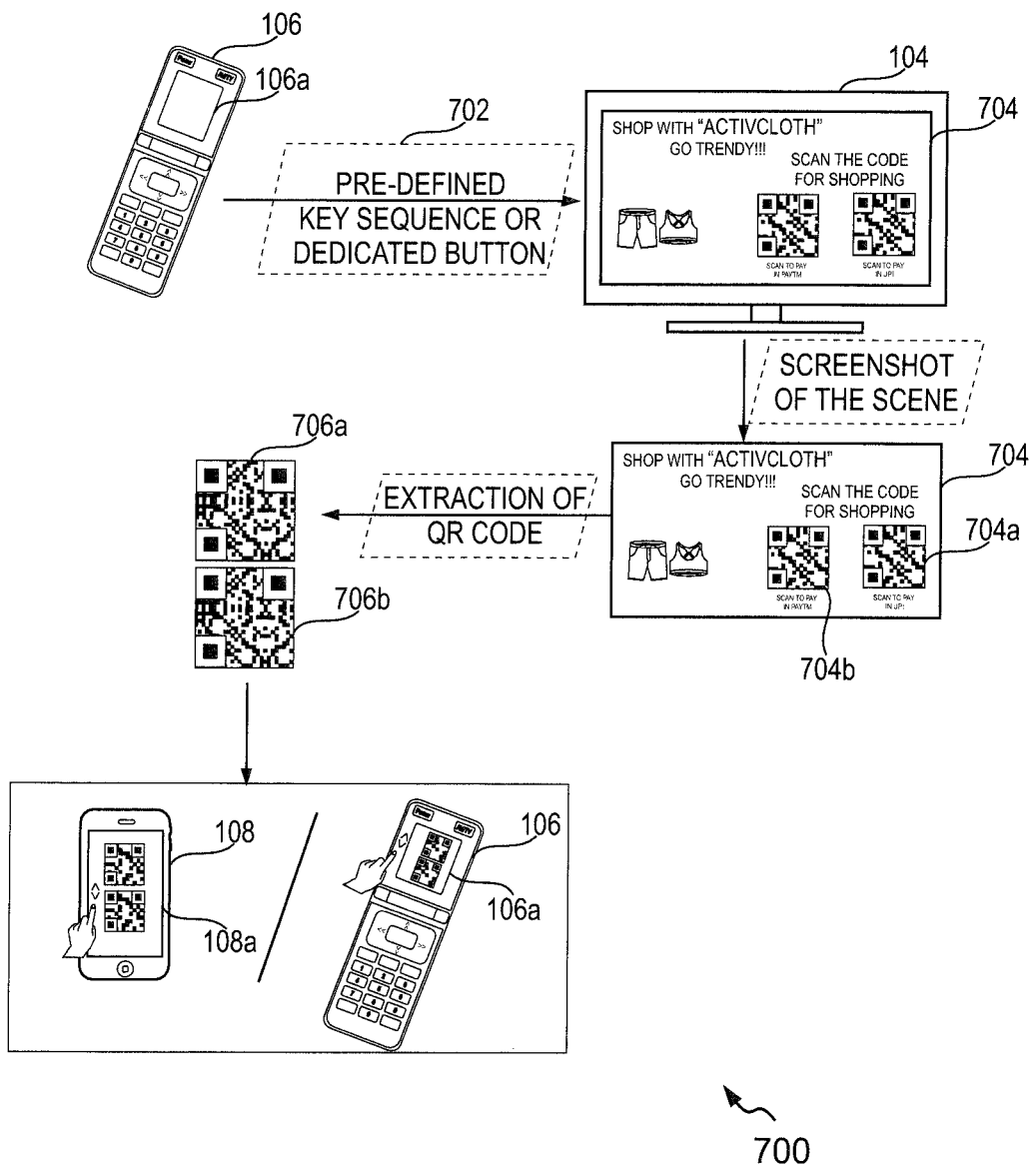
FIG. 7 is another example representation of various inputs and outputs during the process of extracting multiple QR codes from a scene of the advertisement for payment, in accordance with an example embodiment of the present disclosure.

Referring now to FIG. 7, another example representation of various inputs and outputs during the process of extracting multiple QR code or set of QR data of multiple QR codes from the captured screenshot of the scene of the advertisement which comprises multiple QR codes, is shown in accordance with an example embodiment of the present disclosure.

The user 102 interested in the buying an item displayed in the TV advertisement on the TV 104 provides an input 602 to the TV 104 by clicking on a dedicated button on the controller 106 or pressing a pre-defined key sequence on the controller 106.

The input 702 is received by the TV 104 and the application is activated. The application takes screenshot 604 of the scene 704 of the TV advertisement being displayed on the display screen 104a of the TV 104. The application further extracts the multiple QR code images 706a and 706b of the multiple QR codes 704a and 704b from the screenshot 704 of the scene of the TV advertisement. The application sends the QR code images 706a and 706b to at least one of the user device 108 or the controller 106. The extracted QR code images 706a and 706b are displayed on at least one of the display screen 108a of the user device 108 or on the display screen 106a of the controller 106.

The QR code images 706a and 706b are displayed either on the user device 108 or the controller 106, or both, in a scrollable format. The user 102 can scroll upside down or left-right to see the QR code images 706a and 706b on display screen (108a and/or 106a) and choose any QR code from the QR code images 706a and 706b to proceed with the payment process.

Figure 8:
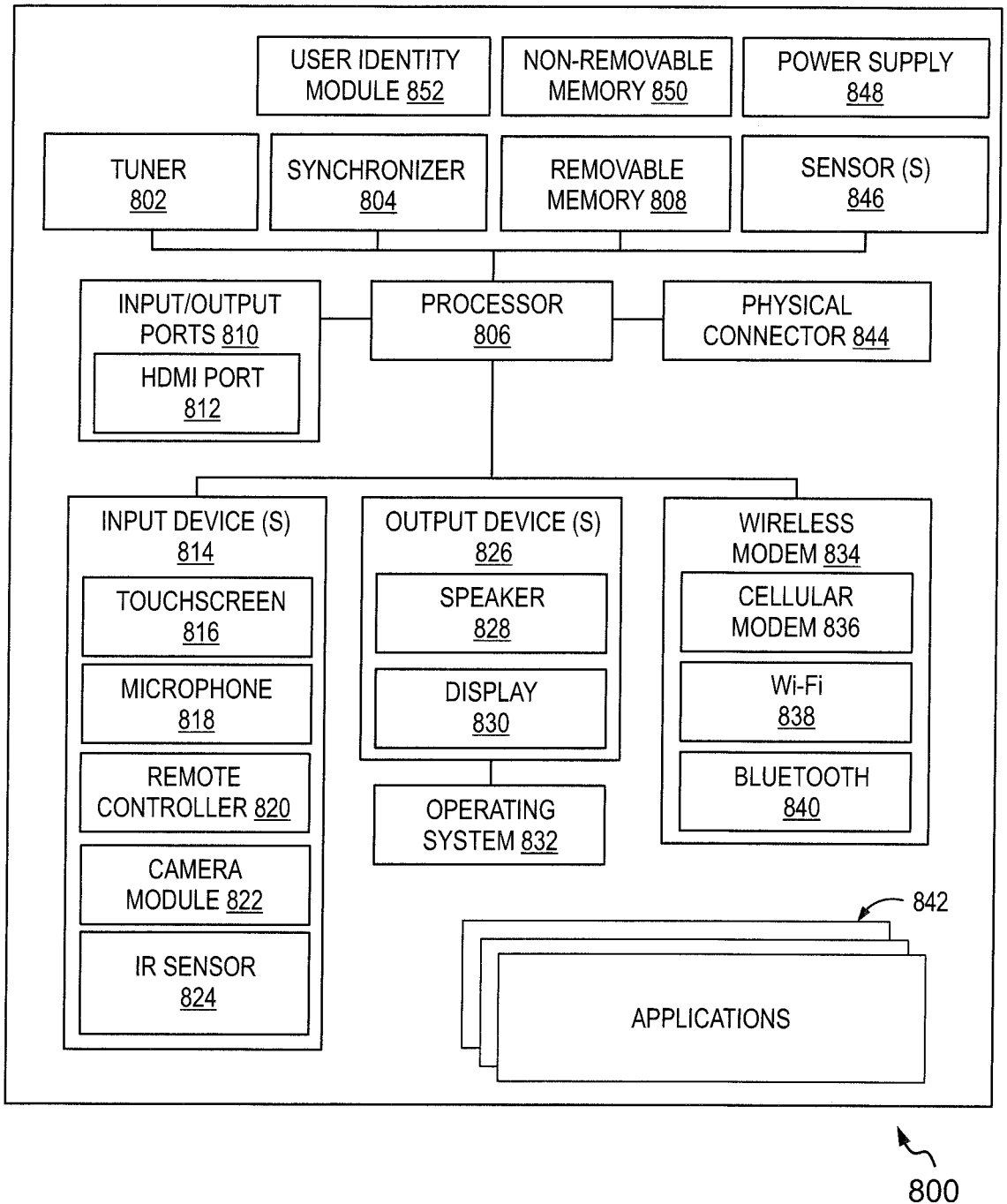
FIG. 8 represents a simplified block diagram of an electronic device, in accordance with an example embodiment of the present disclosure.

FIG. 8 is a simplified block diagram of an electronic device 800 for example, a television capable of implementing the various embodiments of the present disclosure. The electronic device 800 is depicted to include one or more applications 842. The electronic device 800 is an example of the TV 104. It should be understood that the electronic device 800 as illustrated and hereinafter described is merely illustrative of one type of device and should not be taken to limit the scope of the embodiments. As such, it should be appreciated that at least some of the components described below in connection with that the electronic device 800 may be optional and thus in an example embodiment may include more, less or different components than those described in connection with the example embodiment of the FIG. 8. As such, among other examples, the electronic device 800 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 800 includes a tuner 802 for receiving radio broadcast signals and converts them into video signals and audio signals, a synchronizer 804 for synchronizing the video signal with the corresponding audio signal in frequency and time, a controller or a processor 806 (e.g., a signal processor, microprocessor, ASIC, or other control and processing logic circuitry) for performing such tasks as signal coding, data processing, image processing, input/output processing, power control, and/or other functions. An operating system 832 controls the allocation and usage of the components of the electronic device 800 and support for one or more applications programs (see, applications 842), such as an application for facilitating taking screenshot of a scene being displayed on a display 830 the electronic device 800 and reading of QR code displayed in the electronic device 800 of a user (e.g., the user 102). In addition to the application interface, the applications 842 may include common computing applications (e.g., telephony applications, email applications, calendars, contact managers, web browsers, messaging applications such as USSD messaging or SMS messaging or SIM Tool Kit (STK) application) or any other computing application.

The illustrated electronic device 800 includes one or more memory components, for example, a non-removable memory 850 and/or removable memory 808. The non-removable memory 850 and/or removable memory 808 may be collectively known as database in an embodiment. The non-removable memory 850 can include RAM, ROM, flash memory, a hard disk, or other well-known memory storage technologies. The removable memory 808 can include flash memory, embedded multi-media cards (eMMC), smart cards, or a Subscriber Identity Module (SIM). The one or more memory components can be used for storing data and/or code for running the operating system 832 and the applications 842. The electronic device 800 may further include a user identity module (UIM) 852. The UIM 852 may be a memory device having a processor built in. The UIM 852 may include, for example, a universal integrated circuit card (UICC), a universal subscriber identity module (USIM), a removable user identity module (R-UIM), or any other smart card. The UIM 852 typically stores information elements related to a subscriber. The UIM 852 in form of the card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 800 can support one or more input devices 814 and one or more output devices 826. Examples of the input devices 814 may include, but are not limited to, a touch screen/a screen 816 (e.g., capable of capturing finger tap inputs, finger gesture inputs, multi-finger tap inputs, multi-finger gesture inputs, or keystroke inputs from a virtual keyboard or keypad), a microphone 818 (e.g., capable of capturing voice input), a camera module 822 (e.g., capable of capturing still picture images and/or video images) and an infrared (IR) sensor 824. Examples of the output devices 826 may include, but are not limited to a speaker 828 and a display 830. Other possible output devices can include piezoelectric or other haptic output devices. Some devices can serve more than one input/output function. For example, the touch screen 816 and the display 830 can be combined into a single input/output device.

A wireless modem 834 can be coupled to one or more antennas (not shown in the FIG. 8) and can support two-way communications between the processor 806 and external devices, as is well understood in the art. The wireless modem 834 is shown generically and can include, for example, a cellular modem 836 for communicating at long range with the mobile communication network, a Wi-Fi compatible modem 838 for communicating at short range with an external Bluetooth-equipped device or a local wireless data network or router, and/or a Bluetooth-compatible modem 840. The wireless modem 834 is typically configured for communication with one or more cellular networks, such as a GSM network for data and voice communications within a single cellular network, between cellular networks, or between the electronic device 800 and other device within a connected network (Ethernet).

The electronic device 800 can further include one or more input/output ports 810 for establishing connection with peripheral devices including a power supply 848, one or more sensors 846 for example, a gyroscope, or an infrared proximity sensor for detecting the location of the electronic device 800 or any gesture based input for the electronic device 800 and biometric sensors for scanning biometric identity of an authorized user, a HDMI port 812 (for interfacing/receiving uncompressed video or audio signals from a high definition multimedia source) and/or a physical connector 844, which can be a USB port, HDMI port, IEEE 1294 (FireWire) port, and/or RS-232 port. The illustrated components are not required or all-inclusive, as any of the components shown can be deleted and other components can be added.

With the application (see, applications 842) and/or other software or hardware components, the electronic device 800 can implement the technologies described herein. For example, the processor 806 can cause generation of screenshots of scene including one or more QR codes displayed on the electronic device 1200, reading the QR code and extracting the QR code for initiating a payment transaction using the QR code.

Figure 9:
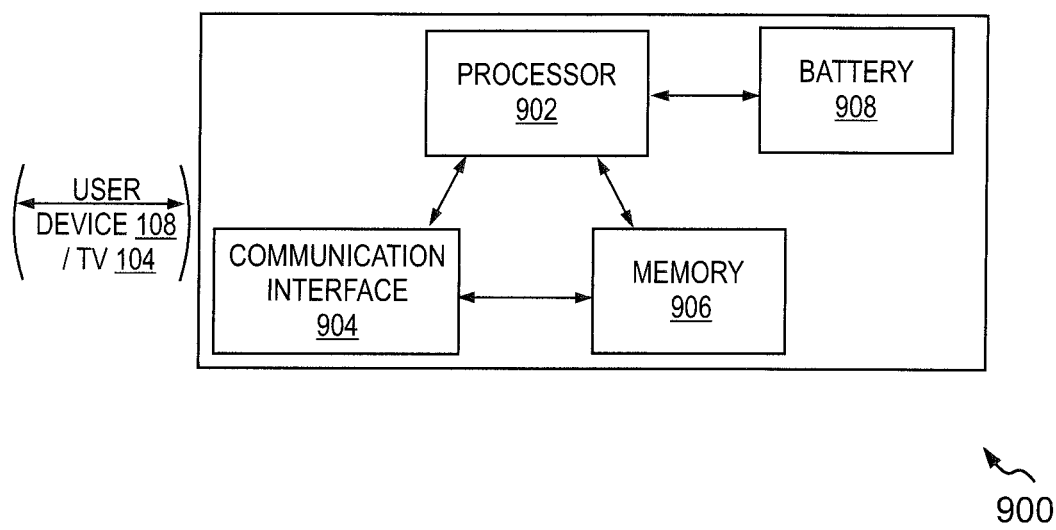
FIG. 9 represents a simplified block diagram of a controller, in accordance with an example embodiment of the present disclosure.

FIG. 9 is a simplified block diagram of a controller 900 for example, a TV controller capable of implementing the various embodiments of the present disclosure. The controller 900 is an example of the controller 106. It should be understood that the electronic device 900 as illustrated and hereinafter described is merely illustrative of one type of device and should not be taken to limit the scope of the embodiments. As such, it should be appreciated that at least some of the components described below in connection with that the controller 900 may be optional and thus in an example embodiment may include more, less or different components than those described in connection with the example embodiment of the FIG. 9. As such, among other examples, the controller 900 could be any controller, for example, a remote controller, a wired controller, a mobile phone, personal digital assistants (PDAs), or any control devices.

The controller 900 includes at least one processor 902, a memory 906, a communication interface 904 and a battery 908. The processor 902 is configured to execute executable instructions for providing various features of the present disclosure. The executing instructions are stored in a memory 906. The components of the controller 900 provided herein may not be exhaustive and that the controller 900 may include more or fewer components than that of depicted in FIG. 9. Further, two or more components may be embodied in one single component, and/or one component may be configured using multiple sub-components to achieve the desired functionalities. Some components of the controller 900 may be configured using hardware elements, software elements, firmware elements and/or a combination thereof.

The processor 902 is operatively coupled to a communication interface 904 such that controller 900 is capable of communicating with a remote device such as a television, a mobile phone (e.g., the TV 104, user device 108) or communicates with any entity within the network 110. In an embodiment, the communication interface 904 comprises input interfaces such as physical keypad, touch keypads, infrared sensors, touch screen or voice assisted input interfaces, and output interfaces such as display screen (e.g., the display screen 106a), LED lights or infrared signals. The communication interface 904 is configured to receive an input from the user 102 for communicating to an electronic device for taking a screenshot of a scene being displayed on the electronic device (e.g., the TV 104). Further, the communication interface 904 facilitates display of content being displayed on the electronic device on the display screen of the controller or display of a QR code image received from the electronic device. The communication may be achieved through API calls, without loss of generality.

The processor 902 is operatively coupled to the memory 906. The memory 906 is configured to store and/or retrieve data, such as, but not limited to, inputs generated by the user and QR code images received from the electronic device. The memory 906, in conjunction with processor 902, may also store information related instructions associated with various inputs provided by the user, for example but not limited to, a key-sequence "*56" indicates sending request to the electronic device for activating an application in the electronic device configured to take screenshot of the scene being displayed on the electronic device.

The processor 902 is configured to facilitate execution of control instructions specific to multiple inputs received from the user via the communication interface 904 and accordingly send these control instructions to the electronic device for controlling operations in the electronic device such as TV 104. The processor 902 is configured to display QR codes received from the electronic device on a display screen of the controller 900. The processor 902 perform one or more of the functions, in a non-limiting manner, such as: executing multiple control instructions to control operations of the electronic device such as switching on or off the electronic device, selecting and channels on the electronic device, adjusting volume and brightness, fast forwarding or pausing any video etc. The processor 902 also configured to execute operations of the controller 900 according to a mode selected by the user 102 for example, if the user 102 selected "QR capture mode" the processor will instruct the communication interface 904 to display QR code image received from the electronic device.

FIG. 10 is a simplified block diagram of a user device 1000 for example, a mobile phone capable of implementing the various embodiments of the present disclosure. The user device 1000 is depicted to include one or more applications 1006. The user device 1000 is an example of the user device 108. It should be understood that the user device 1000 as illustrated and hereinafter described is merely illustrative of one type of device and should not be taken to limit the scope of the embodiments. As such, it should be appreciated that at least some of the components described below in connection with that the user device 1000 may be optional and thus in an example embodiment may include more, less or different components than those described in connection with the example embodiment of the FIG. 10. As such, among other examples, the user device 1000 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1000 includes a controller or a processor 1002 (e.g., a signal processor, microprocessor, ASIC, or other control and processing logic circuitry) for performing such tasks as signal coding, data processing, image processing, input/output processing, power control, and/or other functions. An operating system 1004 controls the allocation and usage of the components of the user device 1000 and support for one or more applications programs (see, applications 1006), such as a QR code reader application for facilitating reading of QR code displayed in the electronic device 800 of a user (e.g., the user 102) or a payment application 105 for facilitating payment transactions between user 102 and merchant 112. In addition to the application interface, the applications 1006 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 1000 includes one or more memory components, for example, a non-removable memory 1008 and/or removable memory 1010. The non-removable memory 1008 and/or removable memory 1010 may be collectively known as database in an embodiment. The non-removable memory 1008 can include RAM, ROM, flash memory, a hard disk, or other well-known memory storage technologies. The removable memory 1010 can include flash memory, smart cards, or a Subscriber Identity Module (SIM). The one or more memory components can be used for storing data and/or code for running the operating system 1004 and the applications 1006. The user device 1000 may further include a user identity module (UIM) 1012. The UIM 1012 may be a memory device having a processor built in. The UIM 1012 may include, for example, a subscriber identity module (SIM), a universal integrated circuit card (UICC), a universal subscriber identity module (USIM), a removable user identity module (R-UIM), or any other smart card. The UIM 1012 typically stores information elements related to a mobile subscriber. The UIM 1012 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1000 can support one or more input devices 1020 and one or more output devices 1030. Examples of the input devices 1020 may include, but are not limited to, a touch screen/a screen 1022 (e.g., capable of capturing finger tap inputs, finger gesture inputs, multi-finger tap inputs, multi-finger gesture inputs, or keystroke inputs from a virtual keyboard or keypad), a microphone 1024 (e.g., capable of capturing voice input), a camera module 1026 (e.g., capable of capturing still picture images and/or video images) and a physical keyboard 1028. Examples of the output devices 1030 may include, but are not limited to a speaker 1032 and a display 1034. Other possible output devices can include piezoelectric or other haptic output devices. Some devices can serve more than one input/output function. For example, the touch screen 1022 and the display 1034 can be combined into a single input/output device.

A wireless modem 1040 can be coupled to one or more antennas (not shown in the FIG. 10) and can support two-way communications between the processor 1002 and external devices, as is well understood in the art. The wireless modem 1040 is shown generically and can include, for example, a cellular modem 1042 for communicating at long range with the mobile communication network, a Wi-Fi compatible modem 1044 for communicating at short range with an external Bluetooth-equipped device or a local wireless data network or router, and/or a Bluetooth-compatible modem 1046. The wireless modem 1040 is typically configured for communication with one or more cellular networks, such as a GSM network for data and voice communications within a single cellular network, between cellular networks, or between the mobile phone 1000 and a public switched telephone network (PSTN).

The user device 1000 can further include one or more input/output ports 1050 for establishing connection with peripheral devices including a power supply 1052, one or more sensors 1054 for example, an accelerometer, a gyroscope, a compass, or an infrared proximity sensor for detecting the orientation or motion of the user device 1000 and biometric sensors for scanning biometric identity of an authorized user, a transceiver 1056 (for wirelessly transmitting analog or digital signals) and/or a physical connector 1060, which can be a USB port, IEEE 1294 (FireWire) port, and/or RS-232 port. The illustrated components are not required or all-inclusive, as any of the components shown can be deleted and other components can be added.

With the application (see, applications 1006) and/or other software or hardware components, the user device 1000 can implement the technologies described herein. For example, the processor 1002 can cause generation of one or more UIs for accessing a QR code displayed on the user device 1000, reading the QR code using the QR reading application and initiating a payment transaction using the payment application based on the QR code. In an exemplary embodiment the user device 1000 (e.g., user device 108) may also function as the controller 106 for controlling operations of the electronic device (e.g., TV 104) based on user's inputs.

Figure 11:
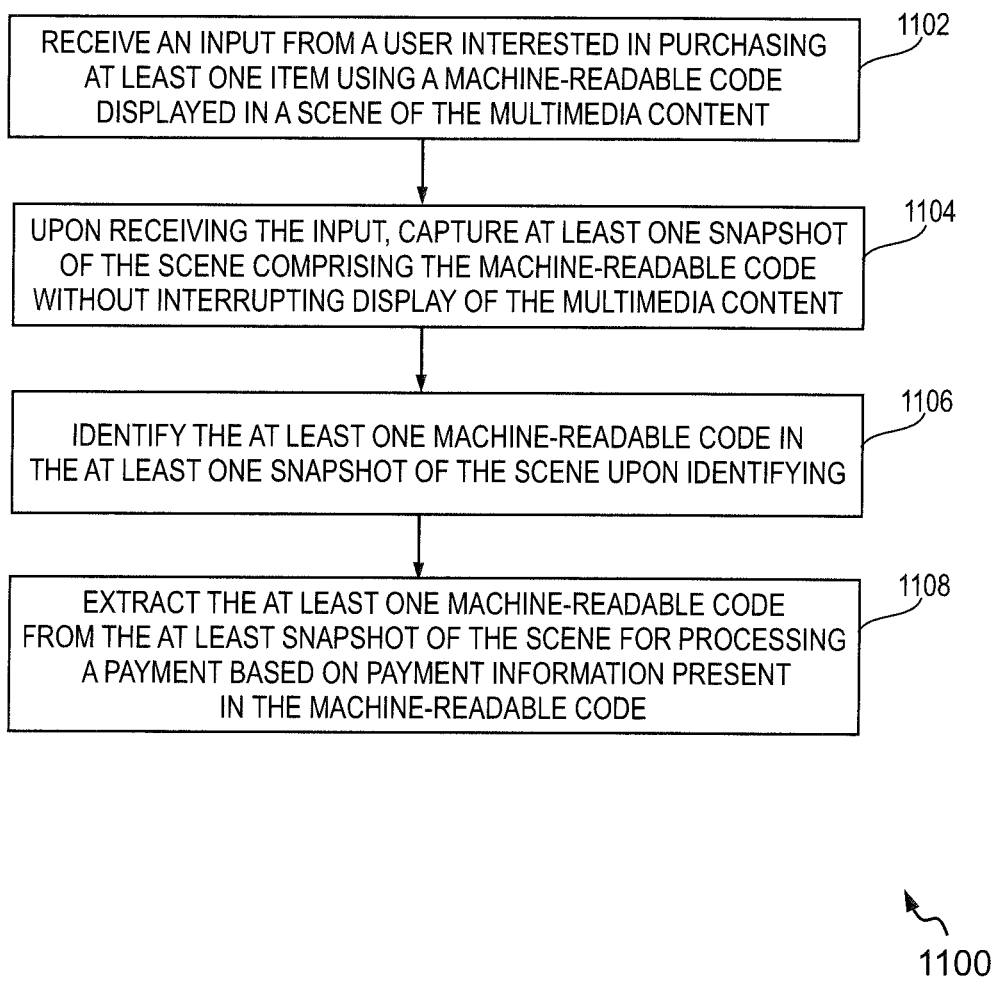
FIG. 11 represents a flow diagram depicting a method for facilitating online shopping for the item through advertisement by extracting QR code image displayed on the advertisement of the item, in accordance with an example embodiment.

FIG. 11 illustrates a flow diagram depicting a method 1100 for facilitating online shopping for the item through the TV advertisement by extracting QR code image (e.g., the QR code 122) displayed on the advertisement of the item, in accordance with another example embodiment. Operations of the flow diagram 1100, and combinations of operation in the flow diagram 1100, may be implemented by, for example, hardware, firmware, a processor, circuitry and/or a different device associated with the execution of software that includes one or more computer program instructions. The operations of the method 1100 are described herein may be performed by an application interface, for example, the application in the TV 104 that is hosted and managed with help of the processor in the TV 104. The method 100 starts at operation 1102.

At operation 1102, the method 1100 includes receiving an input from a user interested in purchasing at least one item using a machine-readable code displayed in a scene of the multimedia content. In one example embodiment, the multimedia content corresponds to a TV advertisement branding for an item of a merchant 112. The user 102 interested in the item provides an input to the TV 104 by performing an action on the controller 106 by which the user 102 is controlling the TV 104. The action includes one of a click on a dedicated button on the controller 106, pressing a pre-defined sequence of at least one of the alphabets, numeric or special characters present on the controller 106, performing a pre-defined gesture in proximity of the TV 104, giving a voice input to the TV 104 or pre-defined movement of the controller 106 in a particular direction.

At operation 1104, upon receiving the input, capturing at least one screenshot of the scene comprising the machine-readable code, without interrupting display of the multimedia content. For example, there is no impact on the program that the user is viewing on the IV. The input received from the user 102 activates an application (shown in FIG. 9) installed in the TV 104. The application can be pre-installed application in the TV 104 or it can be installed from a server, communicatively coupled to TV 104, based on request from the TV 104. Upon activation, the application is configured to take a screen shot of the scene which includes the at least one QR code 122 for purchasing the item.

At operation 1106, the method includes identifying, using the application, the at least one machine-readable code in the at least one screenshot of the scene.

At operation 1108, the method includes upon identifying, extracting the at least one machine-readable code from the at least screenshot of the scene for processing a payment based on payment information present in the machine-readable code.

The sequence of operations of the method 1100 need not be necessarily executed in the same order as they are presented. Further, one or more operations may be grouped together and performed in form of a single step, or one operation may have several sub-steps that may be performed in parallel or in sequential manner.

Figure 12:
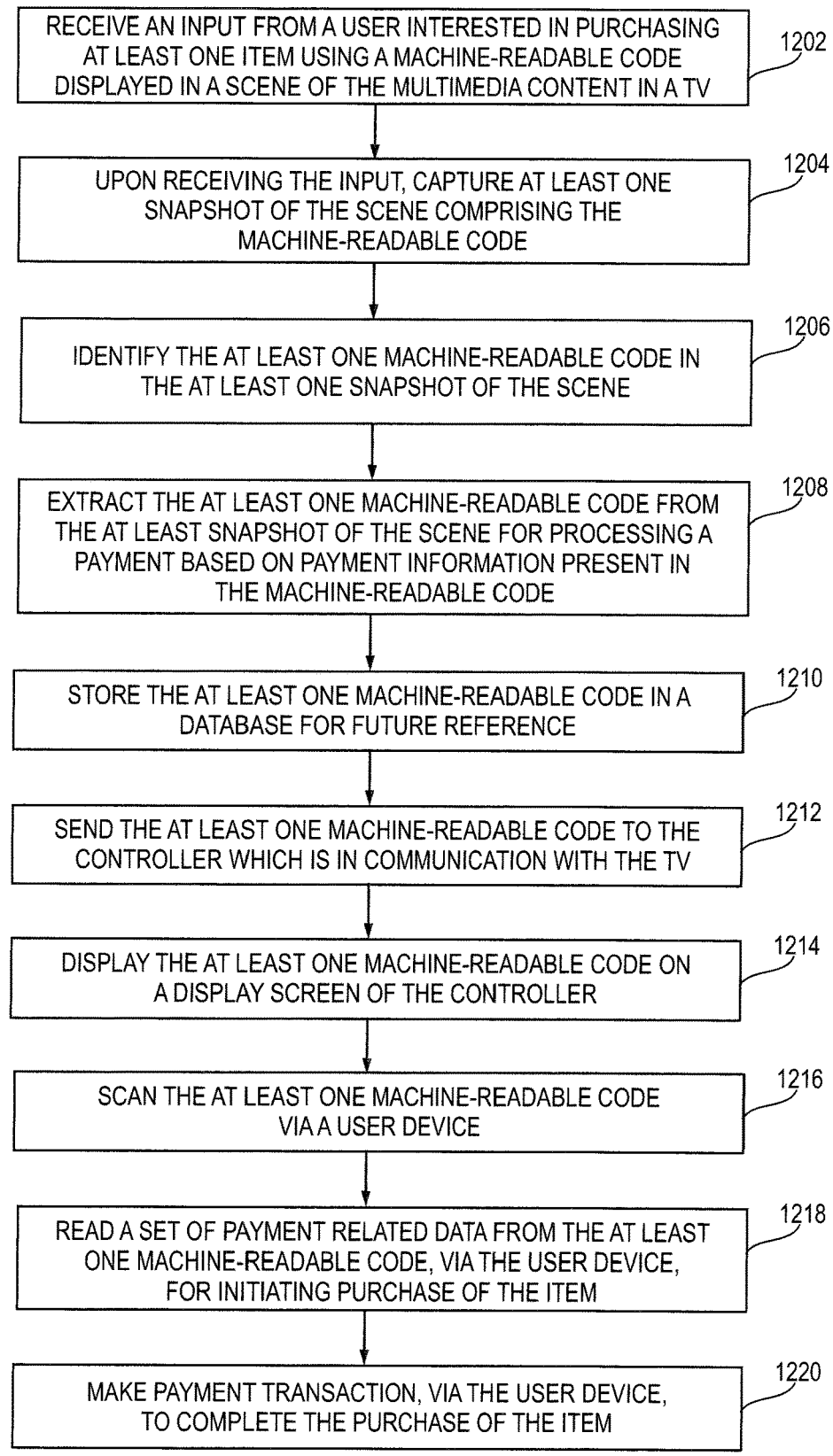
FIG. 12 illustrates a method for facilitating online shopping for the item through advertisement by extracting QR code image from the advertisement of the item on TV, in accordance with another example embodiment of the present disclosure.

FIG. 12 illustrates a flow diagram depicting another method 1200 for facilitating online shopping for the item through the TV advertisement by extracting QR code image (e.g., the QR code 122) displayed on the advertisement of the item, in accordance with another example embodiment. Operations of the flow diagram 1200, and combinations of operation in the flow diagram 1200, may be implemented by, for example, hardware, firmware, a processor, circuitry and/or a different device associated with the execution of software that includes one or more computer program instructions. The operations of the method 1200 are described herein may be performed by an application interface, for example, the application in the TV 104 that is hosted and managed with help of the processor in the TV 104. The method 100 starts at operation 1102.

At operation 1202, the method 1200 includes receiving an input from a user interested in purchasing at least one item using a machine-readable code displayed in a scene of the multimedia content. The multimedia content corresponds to a TV advertisement branding for an item of a merchant 112. The user 102 interested in the item provides an input to the electronic device (e.g., TV 104) by performing an action on the controller 106 by which the user 102 is controlling the electronic device. The action includes one of a click on a dedicated button on the controller 106, pressing a pre-defined sequence of at least one of the alphabets, numeric or special characters present on the controller 106, performing a pre-defined gesture in proximity of the electronic device, giving a voice input to the electronic device or pre-defined movement of the controller 106 in a particular direction.

At operation 1204, upon receiving the input, the method 1200 includes capturing at least one screenshot of the scene comprising the machine-readable code. The input received from the user 102 activates an application (shown in FIG. 8) installed in the electronic device (e.g., TV 104). Upon activation, the application is configured to take a screenshot of the scene which includes the at least one machine-readable code (e.g., QR code 122) for purchasing the item.

At operation 1206, the method 1200 includes identifying, using the application, the at least one machine-readable code in the at least one screenshot of the scene.

At operation 1208, the method 1200 includes upon identifying, extracting the at least one machine-readable code from the at least screenshot of the scene for processing a payment based on payment information present in the machine-readable code.

At operation 1210, the method 1200 optionally includes storing the at least one machine-readable code in a database of the electronic device for future reference.

At operation 1212, the method 1200 includes sending the at least one machine-readable code to a controller which is communicatively coupled with the electronic device for controlling operations of the electronic device.

At operation 1214, the method 1200 includes displaying the at least one machine-readable code on a display screen of the controller.

The controller (e.g., the controller 106) comprises a display screen which is configured to display, in "a content streaming mode", the multi-media content which is being displayed on the electronic device, and display, in a "QR capture mode", the at least machine-readable sent from the electronic device. The user 102 selects the QR capture mode for displaying the at least one machine-readable code on the display screen of the controller.

At operation 1216, the at least one machine-readable code is scanned using a user device (e.g. user device 108).

In the QR capture mode the at least one QR code 122 is scanned by any electronic device, for example in a non-limiting manner the user device 108, supporting a payment application which enables scanning of the QR code 122 and further supports reading the set of QR data from the QR code 122.

At operation 1218, the method 1200 includes reading of a set of payment related data from the at least one machine-readable code, via the user device 108, for initiating purchase of the item. The payment application in the user device 108 initiates payment process by sending set of payment related data of the at least at least one machine-readable code to the payment server 114 via the network 110.

At operation 1220, payment transaction is initiated from the user device 108 and the payment server 114 processes the payment transaction and settles payment transaction between the acquiring server 118 of the merchant 112 and the issuing server 120 of the user 102.

The sequence of operations of the method 1200 need not be necessarily executed in the same order as they are presented. Further, one or more operations may be grouped together and performed in form of a single step, or one operation may have several sub-steps that may be performed in parallel or in sequential manner.

Figure 13:
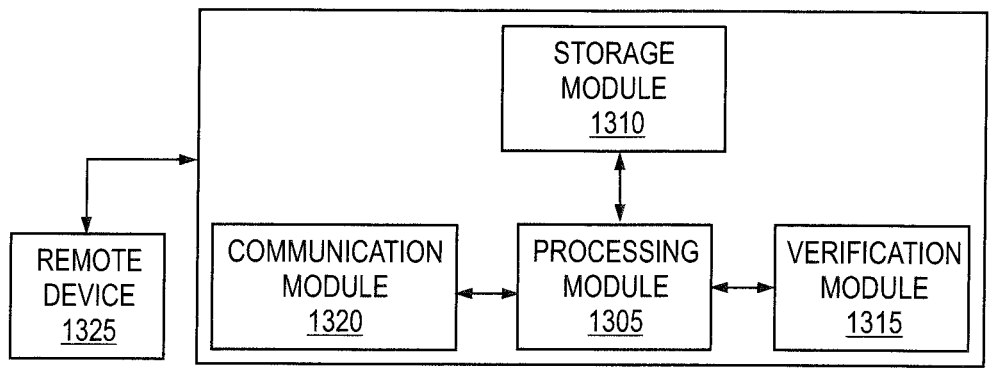
FIG. 13 represents a simplified block diagram of an issuing server, in accordance with an embodiment of the present disclosure.

FIG. 13 is a simplified block diagram of an issuing server 1300, in accordance with one embodiment of the present disclosure. The issuing server 1300 is an example of the issuing server 120 of FIG. 1 or may be embodied in the issuing server 120. The issuing server 1300 is associated with an issuer bank/issuer, in which a cardholder may have an account, which provides a payment card. The issuing server 1300 includes a processing module 1305 operatively coupled to a storage module 1310, a verification module 1315 and a communication module 1320. The components of the issuing server 1300 provided herein may not be exhaustive and that the issuing server 1300 may include more or fewer components than that of depicted in FIG. 13. Further, two or more components may be embodied in one single component, and/or one component may be configured using multiple sub-components to achieve the desired functionalities. Some components of the issuing server 1300 may be configured using hardware elements, software elements, firmware elements and/or a combination thereof.

The storage module 1310 is configured to store machine executable instructions to be accessed by the processing module 1305. Additionally, the storage module 1310 stores information related to, contact information of the customer, bank account number, availability of funds in the account, payment card details, travel information of customers, and/or the like. This information is retrieved by the processing module 1305 for validation.

The processing module 1305 is configured to communicate with one or more remote devices such as a remote device 1325 using the communication module 1320 over a network such as the payment network 116 of FIG. 1. The examples of the remote device 1325 include the merchant terminal 112, the payment server 114, the acquiring server 118, and a central biometric server or other computing systems of issuer and the payment network 116 and the like. The communication module 1320 is capable of facilitating such operative communication with the remote devices and cloud servers using API (Application Program Interface) calls. The communication module 1320 is configured to receive a connectivity information request to determine if the communication terminals are able to communicate effectively. Additionally, the communication module 1320 is also configured to receive the payment transaction request from the merchant terminal 112 via the payment network 116.

The verification module 1315 is configured to verify and validate a customer (such as the user 102), the payment card associated with the cardholder and a PIN of the payment card for approving the transaction. The verification module 1315 may also verify if an issuer account of the customer associated with the payment card have good standing balance. The communication module 1320 is configured to send notification of approval or decline of a payment transaction to the merchant terminal 112 via the payment network 118.

Figure 14:
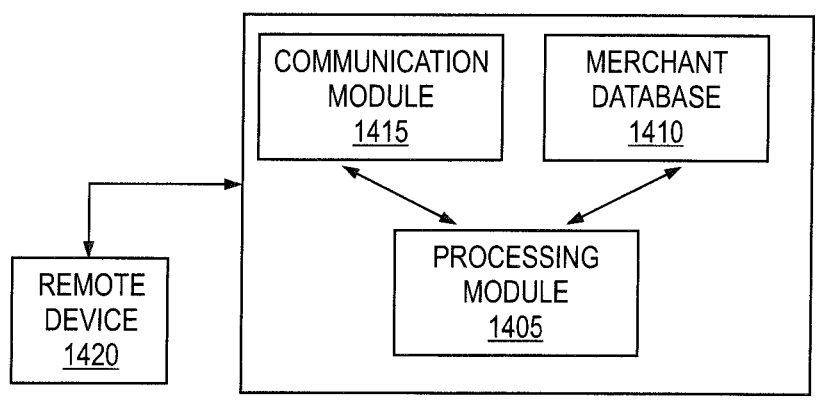
FIG. 14 represents a simplified block diagram of an acquiring server, in accordance with an embodiment of the present disclosure.

FIG. 14 is a simplified block diagram of an acquiring server 1400 for checking network connectivity before performing a payment transaction, in accordance with one embodiment of the present disclosure. The acquiring server 1400 is associated with an acquirer bank, which may be associated with a merchant (e.g., the merchant facility 112) at whose facility the cardholder (e.g., the user 102) is purchasing goods. The merchant may have established an account to accept payment for purchase of goods from customers. The acquiring server 1400 is an example of the acquiring server 118 of FIG. 1 or may be embodied in the acquiring server 118. Further, the acquiring server 1400 is configured to facilitate transaction with the issuing server 120 using the payment network 116 of FIG. 1. The acquiring server 1400 includes a processing module 1405 communicably coupled to a merchant database 1410 and a communication module 1415. The components of the acquiring server 1400 provided herein may not be exhaustive, and that the acquiring server 1400 may include more or fewer components than that of depicted in FIG. 14. Further, two or more components may be embodied in one single component, and/or one component may be configured using multiple sub-components to achieve the desired functionalities. Some components of the acquiring server 1400 may be configured using hardware elements, software elements, firmware elements and/or a combination thereof.

The merchant database 1410 includes a table which stores one or more merchant parameters, such as, but not limited to, a merchant primary account number (PAN), a merchant name, a merchant ID (MID), a merchant category code (MCC), a merchant city, a merchant postal code, an MAID, a merchant brand name, terminal identification numbers (TIDs) associated with merchant terminals (e.g., the POS terminals or any other merchant electronic devices) used for processing transactions, among others. The communication module 1415 is configured to receive a connectivity information request and the processing module 1405 is configured to generate a connectivity check message and a payment transaction request in response to the connectivity information request. Moreover, the merchant database 1410 is also configured to store the payment transaction request. The processing module 1405 is configured to use the MID or any other merchant parameter such as the merchant PAN to identify the merchant during the normal processing of payment transactions, adjustments, chargebacks, end-of-month fees, loyalty programs associated with the merchant and so forth. The processing module 1405 may be configured to store and update the merchant parameters in the merchant database 1410 for later retrieval. In an embodiment, the communication module 1415 is capable of facilitating operative communication with a remote device 1420, such as, payment entities in the payment network 116.

Figure 15:
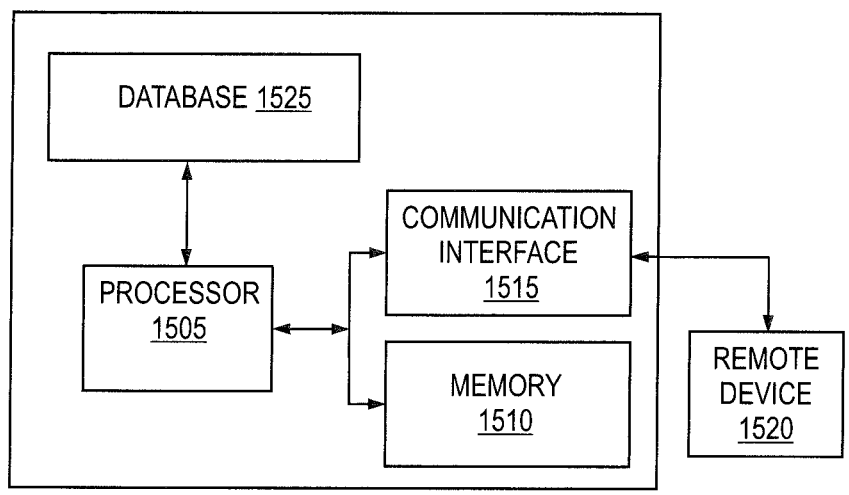
FIG. 15 represents a simplified block diagram of a payment server, in accordance with an embodiment of the present disclosure.

FIG. 15 is a simplified block diagram of a payment server 1500 used for facilitating payment transactions to a merchant, in accordance with an embodiment of the present disclosure. The payment server 1500 is an example of the payment server 114 of FIG. 1. The payment network 116 may be used by the payment server 1500, the issuing server 1300 and the acquiring server 1400 as a payment interchange network. Examples of payment interchange network include, but not limited to, Mastercard® payment system interchange network. The payment server 1500 includes a processor 1505 configured to extract programming instructions from a memory 1510 to provide various features of the present disclosure. The components of the payment server 1500 provided herein may not be exhaustive and that the payment server 1500 may include more or fewer components than that of depicted in FIG. 15. Further, two or more components may be embodied in one single component, and/or one component may be configured using multiple sub-components to achieve the desired functionalities. Some components of the payment server 1500 may be configured using hardware elements, software elements, firmware elements and/or a combination thereof.

Via a communication interface 1515, the processor 1505 receives request from a remote device 1520 such as the acquiring server 1400. The request may be a payment transaction request from the acquiring server 1400. In one example, the processor 1505 receives messages related to payment transaction processing from the acquiring server 1400 and issuing server 1300 via the communication interface 1515. The communication may be achieved through API calls, without loss of generality. The payment server 1500 includes a database 1525, such as a transaction database. The database 1525 may include transaction processing data, such as Issuer ID, country code, acquirer ID, among others. In addition, the processor 1505 may store information of the merchant 112 and the cardholder/user 102.

The database 1525 is any computer-operated hardware suitable for storing and/or retrieving data, such as, but not limited to, customers, merchants, issuer, acquirer and any data that is required for processing payment by the interchange network. The database 1525 may include multiple storage units such as hard disks and/or solid-state disks in a redundant array of inexpensive disks (RAID) configuration. The database 1525 may include a storage area network (SAN) and/or a network attached storage (NAS) system.

In some embodiments, the database 1525 may be accessed by the processor 1505 using a storage interface (not shown). The storage interface is any component capable of providing the processor 1505 with access to the database 1525. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1505 with access to the database 1525.

Without in any way limiting the scope, interpretation, or application of the claims appearing below, a technical effect of one or more of the example embodiments disclosed herein is to provide computer implemented methods and systems for facilitating online shopping and payment transaction through advertisements running on an electronic device while viewing multimedia content on the electronic device. The advertisements comprise QR codes containing encrypted payment related details. Further, the limitation to quickly scan the QR code using a user device for purchasing the item advertised on the electronic device is precluded. Moreover, enhancement in user experience of purchasing any item through advertisements while viewing any multimedia content on the electronic device is served. The user needs to give one pre-defined input when the scene of the advertisement including the QR code is being displayed on the electronic, and the user can purchase the advertised item anytime by simply using the user device for payment. Therefore, the present disclosure eliminates the hassle of quickly scanning the QR code for purchasing the advertised item or missing the scanning of the QR code as the scene moved very fast while trying to purchase the advertised item. The integration of the controller, user device and the electronic in the manner described throughout the description makes the process of online shopping through advertisements very convenient for the user.

The disclosed methods with reference to FIGS. 1 to 15, or one or more operations of the flow diagram 1100 and the flow diagram 1200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the systems 800, 900 and 1000 (e.g. payment server 114) and their various components such as the processor and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for facilitating online shopping while viewing multimedia content on an electronic device, the method comprising:

receiving, by the electronic device displaying the multimedia content, an input from a controller, wherein the input indicates interest in purchasing at least one item, wherein multiple machine-readable codes are displayed in a scene of the multimedia content, the scene comprising the multiple machine-readable codes, a machine-readable code in the multiple machine-readable codes comprising payment related information for purchasing the at least one item;

upon receiving the input, capturing, by an application associated with the electronic device, at least one screenshot of the scene comprising the multiple machine-readable codes without interrupting display of the multimedia content;

identifying the multiple machine-readable codes in the at least one screenshot of the scene;

upon identifying, extracting the multiple machine-readable codes from the at least one screenshot of the scene; and sending the multiple machine-readable codes to a user device for processing a payment based on the payment related information present in the at least one machine-readable code, wherein a user associated with the user device chooses the machine-readable code associated with the at least one item from the multiple machine-readable codes to proceed with a payment process.

2. The method according to claim 1, wherein the input from the user comprises at least one of a pre-defined sequence of keys, press of a dedicated button on the controller, a hand gesture, a voice command, or a touch input.

3. The method according to claim 1, further comprising:
storing the multiple machine-readable codes in a database communicatively coupled with the electronic device; and
sending the multiple machine-readable codes to the user device associated with the user, wherein the multiple machine-readable codes is a quick response (QR) code.

4. The method according to claim 3, wherein: the payment related information is identified by a machine-readable code scanning application in the user device upon reception of the multiple machine-readable codes; and the payment process is initiated using a payment application in the user device for making payment for the at least one item based on the identified payment related information.

5. The method according to claim 1, further comprising:
identifying the payment related information from the machine-readable code in the multiple machine-readable codes associated with the at least one item, wherein the machine-readable code includes a quick response (QR) code; and
sending the identified payment related information to the user device associated with the user.

6. The method according to claim 5, wherein upon receiving the payment related information, the payment process is initiated using a payment application in the user device for making a payment for the at least one item.

7. The method according to claim 1, further comprising:
sending the multiple machine-readable codes to the controller, wherein at least one machine-readable code in the machine-readable codes is displayed on a display screen of the controller, and wherein at least one machine-readable code in the multiple machine-readable codes includes a quick response (QR) code.

8. The method according to claim 7, wherein the at least one machine-readable code displayed on the display screen of the controller is scanned using a payment application configured in the user device, wherein the payment related information is extracted from the at least one machine-readable code for making a payment for the purchase of the at least one item, and wherein the payment is made, via the payment application, based on the payment related information.

9. The method according to claim 7, further comprising:
identifying and extracting the multiple machine-readable codes from the screenshot of the scene;
arranging the multiple machine-readable codes in a stack in a database;
sending at least one machine-readable code from the multiple machine-readable codes to at least one of the user device or the controller; and
displaying the at least one machine-readable code from the multiple machine-readable codes in a sequential manner on at least one of a display screen of the user device or a display screen of the controller.

10. A system for facilitating online shopping while viewing multimedia content on an electronic device, the system comprising:

a controller, associated with a user viewing the multimedia content, for sending a pre-defined input; and
the electronic device configured to stream and display the multimedia content, the electronic device comprising a memory comprising stored instructions, and at least one processor configured to execute the stored instructions to cause the electronic device to perform at least:
receiving the pre-defined input from the controller, wherein the pre-defined input indicates interest in purchasing at least one item using at least one machine-readable code from multiple machine-readable codes displayed in a scene of the multimedia content, the scene comprising the multiple machine-readable codes, the at least one machine-readable code comprising payment related information for purchasing the at least one item;
upon receiving the pre-defined input, capturing at least one screenshot of the scene comprising the multiple machine-readable codes;
identifying the multiple machine-readable codes in the at least one screenshot of the scene;
upon identifying, extracting the multiple machine-readable codes from the at least one screenshot of the scene for processing a payment based on the payment related information present in the at least one machine-readable code; and
sending the multiple machine-readable codes to a user device for processing a payment based on the payment related information present in the at least one machine-readable code, wherein a user associated with the user device chooses the at least one machine-readable code associated with the at least one item from the multiple machine-readable codes to proceed with a payment process.

11. The system according to claim 10, wherein the pre-defined input from the user comprises at least one of a pre-defined sequence of keys, press of a dedicated button on the controller, a hand gesture, a voice command, or a touch input.

12. The system according to claim 10, wherein the system is further caused to perform:
storing the multiple machine-readable codes in a database communicatively coupled with the electronic device, wherein the at least one machine-readable code is a quick response (QR) code; and
sending the at least one machine-readable code to a user device associated with the user.

13. The system according to claim 12, wherein: the payment related information is identified by a machine-readable code scanning application in the user device upon reception of the at least one machine-readable code; and a payment process is initiated using a payment application in the user device for making payment for the at least one item based on the identified payment related information.

14. The system according to claim 10, wherein the system is further caused to perform:
identifying the payment related information from the at least one machine-readable code; and
sending the identified payment related information to the user device associated with the user.

15. The system according to claim 10, wherein the electronic device is further caused to perform at least:
sending the at least one machine-readable code to the controller, wherein the at least one machine-readable code is displayed on a display screen of the controller.

16. The system according to claim 15, wherein the at least one machine-readable code displayed on the display screen of the controller is scanned using a payment application configured in the user device, wherein the payment related information is extracted from the at least one machine-readable code for making a payment for the purchase of the at least one item, and wherein the payment is made, via the payment application, based on the payment related information.

17. The system according to claim 15, wherein the system is further caused to perform at least:
- identifying and extracting the multiple machine-readable codes from the screenshot of the scene;
- arranging the multiple machine-readable codes in a stack in a database;
- sending the multiple machine-readable codes to at least one of a user device or the controller; and
- displaying the multiple machine-readable codes in a sequential manner on at least one of a display screen of the user device or a display screen of the controller.

18. A method for facilitating online shopping while viewing multimedia content on an electronic device, the method comprising:
- receiving an input from a controller, wherein the input indicates interest in purchasing at least one item using a machine-readable code displayed in a scene of the multimedia content, the scene comprising multiple machine-readable codes, the machine-readable code comprising payment information for purchasing the at least one item;
- capturing at least one screenshot of the scene comprising the multiple machine-readable codes;
- identifying the multiple machine-readable codes in the at least one screenshot of the scene;
- storing the multiple machine-readable codes in a database of the electronic device; and
- sending the multiple machine-readable codes to the controller which is in communication with the electronic device, wherein the multiple machine-readable codes are displayed on a display screen of the controller, wherein the machine-readable code comprising the payment information for purchasing the at least one item is scanned via a user device, for initiating purchase of the item, and wherein a payment transaction is made via the user device, to complete the purchase of the item.

19. The method according to claim 18, wherein the payment related information comprises at least one of a merchant account details, a payment amount or details of the item.

20. The method according to claim 18, wherein the machine-readable code is a quick response (QR) code.

* * * * *